United States Patent [19]

Katto et al.

[11] Patent Number: 5,072,354

[45] Date of Patent: Dec. 10, 1991

[54] PULSE-WIDTH MODULATION TYPE INVERTER APPARATUS

[75] Inventors: Masayuki Katto; Koyo Yamashita, both of Nagoya, Japan

[73] Assignee: Mitsubishi Denki Kabushiki Kaisha, Tokyo, Japan

[21] Appl. No.: 519,376

[22] Filed: May 3, 1990

[30] Foreign Application Priority Data

May 16, 1989 [JP] Japan ................................. 1-121713
Mar. 13, 1990 [JP] Japan ................................. 2-61647

[51] Int. Cl.⁵ ................... H02M 1/12; H02M 7/5387
[52] U.S. Cl. ........................................ 363/41; 363/58; 363/98; 318/811
[58] Field of Search ............... 363/41.58, 98; 318/801, 318/802, 808, 811, 812

[56] References Cited

U.S. PATENT DOCUMENTS 4,621,316 11/1986 Uesugi .............................. 363/41 X
4,847,743 7/1989 Kamiyama .......................... 363/41
4,878,163 10/1989 Yamato et al. ..................... 363/41 X Primary Examiner—Steven L. Stephan
Assistant Examiner—Emanuel Todd Voettz
Attorney, Agent, or Firm—Rothwell, Figg, Ernst & Kurz

[57] ABSTRACT

An improvement of control for prevention of a short circuit between controllable elements used as switching elements in a pulse-width modulation type inverter apparatus which outputs a variable amplitude or variable frequency a.c. voltage. The pulse-width modulation type inverter apparatus is of a type wherein, a selecting means selects an output from a processing means within a period during which the result of detection by a current detector falls within a region of substantially zero level and also selects only a signal corresponding to each switching element which effectively acts on the generation of the output current, out of signals generated by a PWM signal generating means during a period other than the above-described period, thereby to output the same as a drive signal for the switching element.

17 Claims, 21 Drawing Sheets

| ADDRESS | | | | | DATA | |
|---|---|---|---|---|---|---|
| $\varphi$ | | VOLTAGE COMMAND | | PHASE COMMAND | | |
| $A_n$ | $A_{n-1}$ | $A_{n-2}$ ~ $A_{n-x}$ | | $A_{n-x-1}$ ~ $A_0$ | $2^7$ ~ $2^0$ | |
| 0 | 0 | 0 ~ 0 | | 0 ~ 0 | | DATA CORRESPONDING TO OUTPUT VOLTAGE COMMAND, PHASE COMMAND $\varphi = \pi/3$ |
| | | 0 ~ 1 | | | | |
| | | ⋮ | | ⋮ | ⋮ | |
| 0 | 1 | 0 ~ 0 | | 0 ~ 0 | | DATA CORRESPONDING TO OUTPUT VOLTAGE COMMAND, PHASE COMMAND $\varphi = \pi/6$ |
| | | 0 ~ 1 | | | | |
| | | ⋮ | | ⋮ | ⋮ | |
| 1 | 0 | 0 ~ 0 | | 0 ~ 0 | | DATA CORRESPONDING TO OUTPUT VOLTAGE COMMAND, PHASE COMMAND $\varphi = 0$ |
| | | 0 ~ 1 | | | | |
| | | ⋮ | | ⋮ | ⋮ | |

(REMARKS) DATA IS REPRESENTED IN AN ANALOG FORM

PULSE-WIDTH MODULATION TYPE INVERTER APPARATUS

BACKGROUND OF THE INVENTION

1. Field of the Invention:

The present invention relates to a pulse-width modulation type inverter apparatus for outputting a variable amplitude voltage or variable frequency a.c. voltage, and particularly to an improvement in the control for prevention of a short circuit between controllable elements used as switching elements.

2. Description of the Related Art:

FIG. 16 is a block diagram showing the construction of a conventional pulse-width modulation type inverter apparatus (hereinafer called "PWM type inverter"). In the same drawing, designated at numeral 10 is a d.c. power supply and numeral 20 indicates a power inverter composed of controllable switching elements and diodes connected to each other in antiparallel form, said inverter being adapted to convert a d.c. voltage fed from the d.c. power supply 10 into a variable amplitude or variable frequency a.c. voltage (for the brevity of description, electrical symbols representative of only a single phase are shown here although the inverter is applicable to three-phase voltage generation). Numeral 30 indicates an electric motor which is to be driven by the PWM type inverter. Designated at numeral 40 is a reference voltage generator corresponding to a reference signal generating means for outputting waveforms indicative of reference voltages, i.e., reference-voltage waveforms as references of output frequencies or output voltages. Numeral 50 indicates a carrier generator for generating a carrier waveform of a frequency fc with a triangular waveforms or the like so as to output the same therefrom. Numeral 60 indicates a PWM circuit for generating each striking signal (PWM signal) for each controllable element provided in the power inverter 20 based on signals from the reference voltage generator 40 and the carrier generator 50. Designated at numeral 65 is a processing means for generating each PWM signal by which a short-prevention period $T_d$ is established, based on each signal from the PWM circuit 60 with a view toward preventing a short circuit between upper and lower controllable elements corresponding to each phase designated by the power inverter 20. Numeral 70 indicates a drive circuit for driving each controllable element provided in the power inverter in response to each signal from the processing means 65.

A description will now be made on the operation of the above apparatus. FIG. 18 is a graphic representation of the shapes of waves that typically indicate a PWM operation of this type of PWM type inverter, e.g., FIG. 18 illustrates waveforms for describing the operation of a single U phase employed in the PWM type inverter, out of three phases of U, V and W. As shown in FIG. 17, the reference voltage as a reference of an output voltage or output frequency of the inverter is compared with a signal for modulating the same, e.g., a signal indicative of a carrier waveform as a triangular wave. As shown in FIG. 18(a), period during which the reference voltage is larger than a voltage of the carrier waveform causes the PWM signal to be brought into an on state, while a period during which the reference voltage is smaller than the carrier waveform voltage causes the PWM signal to be brought into an off state, thereby making it possible to obtain the result, as a PWM signal $U_{PO}$ for the upper-side controllable switching element corresponding to the U phase. A PWM signal $U_{NO}$ for the lower-side controllable switching element, which corresponds to the U phase, is generated by inverting the PWM signal $U_{PO}$. In order to prevent the upper-side and lower-side controllable elements from being short circuited, each controllable element is actually driven by short-prevention processed PWM signals UP, $U_N$ which delay on-timing by a time interval corresponding to the short-prevention period $T_d$. As a result, an output voltage corresponding to the U phase is pulse-width modulated in the form of a sine wave, thereby obtaining an output voltage waveform shown in FIG. 18(d). Incidentally, each of output voltages corresponding to V and W phases can be obtained in the above-described manner. A potential shown in FIG. 18(d) represents one corresponding to an imaginary neutral point on a d.c. side.

The above-described reference voltage waveform and carrier waveform are shown in FIG. 18(a). The PWM signals $U_{PO}$ and $U_{NO}$ are depicted in FIG. 18(b) and the output voltage is illustrated in FIG. 18(d). Referring to FIG. 16, the reference voltage generator 40 serves to output a reference voltage waveform shown in FIG. 18(a). The carrier generator 50 serves to generate a carrier waveform in the form of a triangular wave depicted in FIG. 18(a) and the PWM circuit 60 serves to generate a PWM signal illustrated in FIG. 18(b). In addition, the processing means 65 serves to generate a short-prevention processed PWM signal depicted in FIG. 18(c) and the drive circuit 70 activates controllable elements provided in the power inverter 20 using a PWM signal subsequent to a short prevention processing by the processing means 65. The PWM inverter can bring about a variable a.c. voltage or variable a.c. frequency in the above-described manner.

Meanwhile, the influence of the short-prevention period $T_d$ on the output voltage will occur as shown in FIGS. 19 and 20. Its influence differs depending on the polarity of the output current. When the polarity of the output current is positive, the output voltage is outputted at a value lower than the reference voltage during the short-prevention period $T_d$. When the polarity of the output current is negative on the other hand, the output voltage is outputted at a value higher than the reference voltage. Thus, the output voltage is affected by the polarity period of the output current, thereby causing distortion represented by $V_{UN}$ in FIG. 20 owing to an ideal sine wave obtained by reference PWM signal. In addition, the manner of occurrence of distortion in the output voltage is also shown in FIG. 18(e) as distortion (error) which appears in association with the current polarity. Here, $V_{U-O}$, $V_{UO-O}$ each represent a potential in the case where an imaginary neutral point on the d.c. side is considered as a reference.

In other words, an error will occur in a reference voltage signal by the short-prevention period $T_d$ This error is undesirable because of the distortion of the output voltage, the reduction in the output voltage and an increase in torque ripples.

A description will next be made of the PWM type inverter which has been proposed for the purpose of solution of such inconvenience.

FIG. 21 is a block diagram showing the construction of the conventional PWM type inverter which has been disclosed in Japanese Patent Laid-Open No. 60-207494. Designated at numeral 55 is a potential detector for detecting the level of each logic output voltage corresponding to each phase. Numeral 60a indicates a PWM circuit as a PWM signal generating means for generating each striking signal (PWM signal) for each controllable element provided in a power inverter 20, based on signals from a reference voltage generator 40 and a carrier generator 50 and a signal from the potential detector 55. The same elements of structure as those shown in FIG. 16 are identified by like reference numerals and its description will therefore be omitted. A description will hereinafter be made of the operation of correction of the influence of the short-prevention period $T_d$ on the output voltage. In the conventional example shown in FIG. 21, the potential detector 55 for detecting the level of the logic output voltage corresponding to each phase is provided in order to solve the above-described inconvenience. Then, the output signal from the potential detector 55 is compared with the reference PWM signal [e.g., $U_{PO}$, $U_{NO}$ shown in FIG. 18(b)] prior to the short-prevention processing, so that the difference between the voltages corresponding to the signals referred to above is corrected successively.

FIG. 22 is a circuit diagram showing the potential detector 55 in detail, and shows an output unit of the PWM type inverter, corresponding to the U phase. A resistor 15 and a photocoupler 16 are interposed between a U phase output terminal and a d.c. bus N. When the signal Up is positive, the U phase terminal is connected to a d.c. bus P, i.e., the potential is brought into P level, the photocoupler 16 is made conductive, and a detection signal PC, is brought into H level. On the other hand, when the signal UN is positive the U phase output terminal is connected to the d.c. bus N, the photocoupler 16 is made nonconductive, and the deletion signal PC is brought into L level. In the above-described manner, the logic level (polarity) of the actual output voltage is detected, thereby to output the result of detection to the PWM circuit 60a. Incidentally, the operations of V and W phases are also the same as that in the above-described embodiment and their description will therefore be omitted.

A description will next be made of the operation of the potential detector in combination with FIG. 23. For example, a reference signal representative of $U_{PO}$ is compared with a detection signal PC indicative of a potential corresponding to the U phase from the potential detector 55 and errors corresponding to time delays of the change timing from, e.g., L level to H level are accumulated by a counter or the like. When a time delay is made by the time corresponding to the above-accumulated errors during a period of the next change timing from H level to L level and a command is given by the reference signal $U_{PO}$, the time interval indicative of H level is secured only during the same period (the time interval indicative of L level is also secured similarly to the time interval indicative of H level), whereby the error correction is performed so as to obtain a given output voltage As shown in FIG. 23, the graphic representation of the shapes of waves that indicate the operational characteristics about the error correction includes only a short prevention period $T_d$ and a time delay $T_s$ representative of an off state of a main circuit element, and other delay elements are not included therein. In the drawing, UDLY corresponds to a PWM signal subsequent to the correction of the signal $U_{PO}$, and PC corresponds to a signal obtained by detecting the result of operation of elements by the short-prevention processed PWM signal $U_p$ from the signal UDLY.

In addition $\Sigma U$ represents the result of integration or counting of errors in signal between the reference signal and the detection signal.

This proposed apparatus, it is practiced to correct, for example. a time delay indicative of the change timing from L level to H level, which has been stored as data about the time interval between $t_2$ and $t_1$, by delaying the next change timing from H level to L level by a time of transition from $t_3$ to $t_4$.

6a and 6b represent the state of striking of arc (H level) and extinction of arc (L level) of the upper- and lower-side controllable elements corresponding to the U phase, which are shown in FIG. 22, respectively.

As an alternative to the above-described method, there has been proposed a PWM type inverter for controlling the influence of the short-prevention period $T_d$ on the output voltage.

FIG. 24 is a block diagram showing the construction of another conventional PWM type inverter. Numeral 90 is a current detector for detecting output current from the inverter. Numeral 100 indicates a polarity discriminating means which is responsive to an output signal from the current detector 90 for judging whether or not the polarity of output current corresponding to each phase of the inverter is positive or negative. Designated at numeral 40c is a reference voltage generator which is responsive to an output signal from the polarity discriminating means 100 so as to output each reference voltage waveform for correcting each waveform of signals corresponding to preestimated errors such that the output voltage from the inverter becomes the reference voltage. Numeral 60 indicates a PWM circuit for generating each striking signal (PWM signal) for each controllable element provided in a power inverter 20, based on output signals from the reference voltage generator 40c and a carrier generator 50.

The same elements of structure as those shown in FIG. 21 are identified by like reference numerals in FIG. 24 and their description will therefore be omitted.

A description will next be made of the operation of the inverter referred to above. In this PWM type inverter, as shown in FIG. 24, the current detector 90 and the polarity discriminating means 100 are provided in place of the potential detector 55. It is practiced in this unit to judge whether or not the polarity of output current corresponding to each phase is positive or negative and correct each reference voltage waveform according to the polarity of the output current in the direction in which output current affected by the short-prevention period $T_d$ is cancelled.

FIG. 25 illustrates waveforms for describing the operation for the correction of each reference voltage waveform according to the polarity of the output current. FIG. 25 depicts each waveform for describing the operation of correction of the reference voltage waveform corresponding to a U phase alone out of three phases, in an illustrative example representing the case where three-arm control of a type wherein the three phases are always subjected to switching during each cycle period of each of the carrier waveforms shown in FIGS. 18, 19 and 20, is performed.

FIG 25(a) shows a reference voltage waveform and FIG. 25(b) depicts an output current waveform. FIG. 25(c) is a waveform obtained by replacing the level of a voltage $\Delta V$ corresponding to distortion of an output voltage waveform affected by the short-prevention period $T_d$ by the level of the reference voltage waveform. FIG. 25(d) is a waveform representing a polarity discriminating signal $S_2$ as output current and FIG. 25(e) is a waveform representing the level of a voltage for correcting the reference voltage waveform in the direction in which the level of the voltage $\Delta V$ corresponding to the distortion of the output voltage waveform is present. In addition, FIG. 25(f) depicts a phase voltage waveform corresponding to the U phase, having distortion components caused by the influence of the short-prevention period $T_d$ on the output voltage and indicated by the solid line, with respect to a target voltage indicated by the broken line (in practice, FIG. 25(f) shows a PWM waveform, which is in turn represented by analog values for the brevity of description).

As has been described in the article entitled "Short-Prevention Period Regarding Upper and Lower Arms Employed In PWM Inverter" published at the meeting of the Association of Tokai Branch sponsored by the Institute of Electrical Engineering, in 1982 (Showa 57 nendo Denki Gakkai Tokaishibu Rengotaikai), the voltage $\Delta V$ corresponding to the distortion of the output voltage waveform is established by the following expression:

$$\Delta V \propto f_c \cdot T_d$$

where
$f_c$ = carrier frequency
$T_d$ = short-prevention period

Let's now assume that such output current $I_U$ as shown in FIG. 25(b) flows in a state in which an electric motor 30 has been driven by the inverter. At this time, the current detector 90 serves to detect the above-described output current $I_U$, and the polarity discriminating means 100 supplies a polarity discriminating signal $S_2$ shown in FIG. 25(d) to the reference voltage generator 40c based on the signal detected by the current detector 90. Then, the reference voltage generator 40c is responsive to the polarity discriminating signal $S_2$ for generating a correction signal in the direction in which the influence of the short-prevention period $T_d$ on the output voltage, i.e., the voltage $\Delta V$ corresponding to the distortion of the output voltage waveform shown in FIG. 25(c) is cancelled, and for adding the generated signal to the reference voltage waveform depicted in FIG. 25(a) so as to supply the result of addition to the PWM circuit 60. In the above-described manner, the reference voltage waveform is corrected and PWM-calculated in such a way that the influence of the short-prevention period $T_d$ is cancelled in advance according to the polarity of the output current for obtaining an output voltage. Thus, such distortion as indicated by the solid line in FIG. 25(f) is controlled, thereby obtaining such an output voltage waveform as indicated by the broken line.

The conventional pulse-width modulation type inverter apparatus is constructed as described above. Where the short-prevention period $T_d$ is established by the processing means 65 so as to avoid a short circuit between the controllable elements, the short-prevention period $T_d$ exerts a negative influence upon the output voltage. In addition, where the potential detector 55 detects a voltage at each of the junction points between the controllable elements of the inverter arms and the influence of the short-prevention period $T_d$ on the output voltage is corrected by the PWM circuit 60 based on the detected voltage, the logic level of the output voltage to be generated by the potential detector 55 is not established in a region in which the output current is rendered minimum. It is thus impossible to correct the influence of the short-prevention period $T_d$ by the logic correction. Furthermore, where a judgement is made by the polarity discriminating means 100 as to whether or not the polarity of the output current detected by the current detector 90 is positive or negative and a correction signal corresponding to the discriminating signal $S_2$ is generated by the reference signal generator 40c, and the voltage corresponding to the correction signal is added to the reference voltage, thereby correcting the influence of the short-prevention period $T_d$ on the output voltage, a limitation is imposed on the accuracy in discrimination of the polarity discriminating means 100 in zero level region of output current, in which the polarity of the output current is changed from positive to negative or vice versa, thereby causing difficulty in discrimination of the polarity with high accuracy. The influence of the short-prevention period $T_d$ on the output voltage appears remarkably in the vicinity of changeover in the polarity of the output current and hence the period during which the output current remains in the vicinity of the zero level is rendered long. As a result, a period representative of the result of the polarity discrimination of positive or negative is rendered unbalanced in correlation with the limitation of accuracy in the polarity discrimination. In addition, detection errors occur in each point at which the above polarity is to be changed, and hence the influence of the short-prevention period $T_d$ on the output voltage cannot be corrected, thereby causing a problem to be solved by the invention, that the distortion in the output voltage, the reduction in the output voltage, the torque ripples, the irregularity in rotation, etc. is produced.

SUMMARY OF THE INVENTION

With the foregoing problems in view, it is therefore an object of this invention to provide a pulse-width modulation type inverter apparatus which can control the influence on output current by short prevention processing between switching elements and also sufficiently correct each output voltage waveform even within a region in which the output current is rendered minimum, thereby causing no distortion in voltage, reduction in voltage, torque ripples, irregularity in rotation, etc., and bringing about high stability.

According to a first embodiment of this invention, there is provided a pulse-width modulation type inverter apparatus, which comprises an inverter unit composed of arms connected in the form of a three-phase bridge, the arms including a pair of switching elements which are connected in series and on/off controlled in a complementary form, a current detector for detecting output current from the inverter unit, PWM signal generating means for generating pulse-width modulation signals for controlling each of the switching elements, processing means for subjecting each signal generated by the PWM signal generating means to processing for preventing a short circuit between the pair of switching elements, and means for selecting each signal generated by the processing means within a period during which current detected by the current detector falls within substantially zero level and for selecting only a signal corresponding to each switching element which effectively acts on the generation of the output current, out of signals generated by the ·PWM signal generating means, thereby to output the same as a drive signal for each switching element.

According to a second embodiment of this invention, there is provided a pulse-width modulation type inverter apparatus, which comprises an inverter unit composed of arms connected in the form of a three-phase bridge, the arms including a pair of switching elements which are connected in series and on/off controlled in a complementary form, a current detector for detecting output current from the inverter unit, PWM signal generating means for generating pulse-width modulation signals for controlling each of the switching elements, processing means for subjecting each signal generated by the PWM signal generating means to processing for preventing a short circuit between the pair of switching elements, and reference signal generating means for saturating a region corresponding to $\pi/3$(rad) at the maximum during a half cycle of each output voltage waveform corresponding to a desired phase, in association with a region of substantially zero level of current detected by the current detector, thereby to perform two-arm modulation of the remaining phases and for generating each reference signal for outputting each output voltage in substantially the form of a sine wave thereby to supply the same to the PWM signal generating means.

According to a third embodiment of this invention, there is provided a pulse-width modulation type inverter apparatus, which comprises an inverter unit composed of arms connected in the form of a three-phase bridge, the arms including a pair of switching elements which are connected in series and on/off controlled in a complementary form, a current detector for detecting output current from the inverter unit, PWM signal generating means for generating pulse-width modulation signals for controlling each of the switching elements, reference signal generating means for saturating a region corresponding to $\pi/3$(rad) at the maximum during a half cycle of each output voltage waveform corresponding to a desired phase, in association with a region of substantially zero level of current detected by the current detector, thereby to perform two-arm modulation of the remaining phases and for generating each reference signal for outputting each output voltage in substantially the form of a sine wave, thereby to supply the same to the PWM signal generating means, and means for selecting, based each output signal from the current detector, only a signal corresponding to each switching element which effectively acts on the generation of the output current, out of signals generated by the PWM signal generating means, thereby to output the same as a drive signal for each switching element.

According to a fourth embodiment of this invention, there is provided a pulse-width modulation type inverter apparatus, which comprises an inverter unit composed of arms connected in the form of a three-phase bridge, the arms including a pair of switching elements which are connected in series and on/off controlled in a complementary form, a current detector for detecting output current from the inverter unit, PWM signal generating means for generating pulse-width modulation signals for controlling each of the switching elements, processing means for subjecting each signal generated by the PWM signal generating means to processing for preventing a short circuit between the pair of switching elements, reference signal generating means for saturating a region corresponding to $\pi/3$(rad) at the maximum during a half cycle of each output voltage waveform corresponding to a desired phase, in association with a region of substantially zero level of current detected by the current detector, thereby to perform two-arm modulation of the remaining phases and for generating each reference signal for outputting each output voltage in substantially the form of a sine wave, thereby to supply the same to the PWM signal generating means, means for selecting each signal generated by the processing means within a period during which current detected by the current detector falls within substantially zero level and for selecting only a signal corresponding to each switching element which effectively acts on the generation of the output current, out of signals generated by the PWM signal generating means, thereby to output the same as a drive signal for each switching element.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 8 is a format for illustrating the contents of data stored in a ROM;

DETAILED DESCRIPTION OF THE PREFERRED EMBODIMENTS

Figure 1:
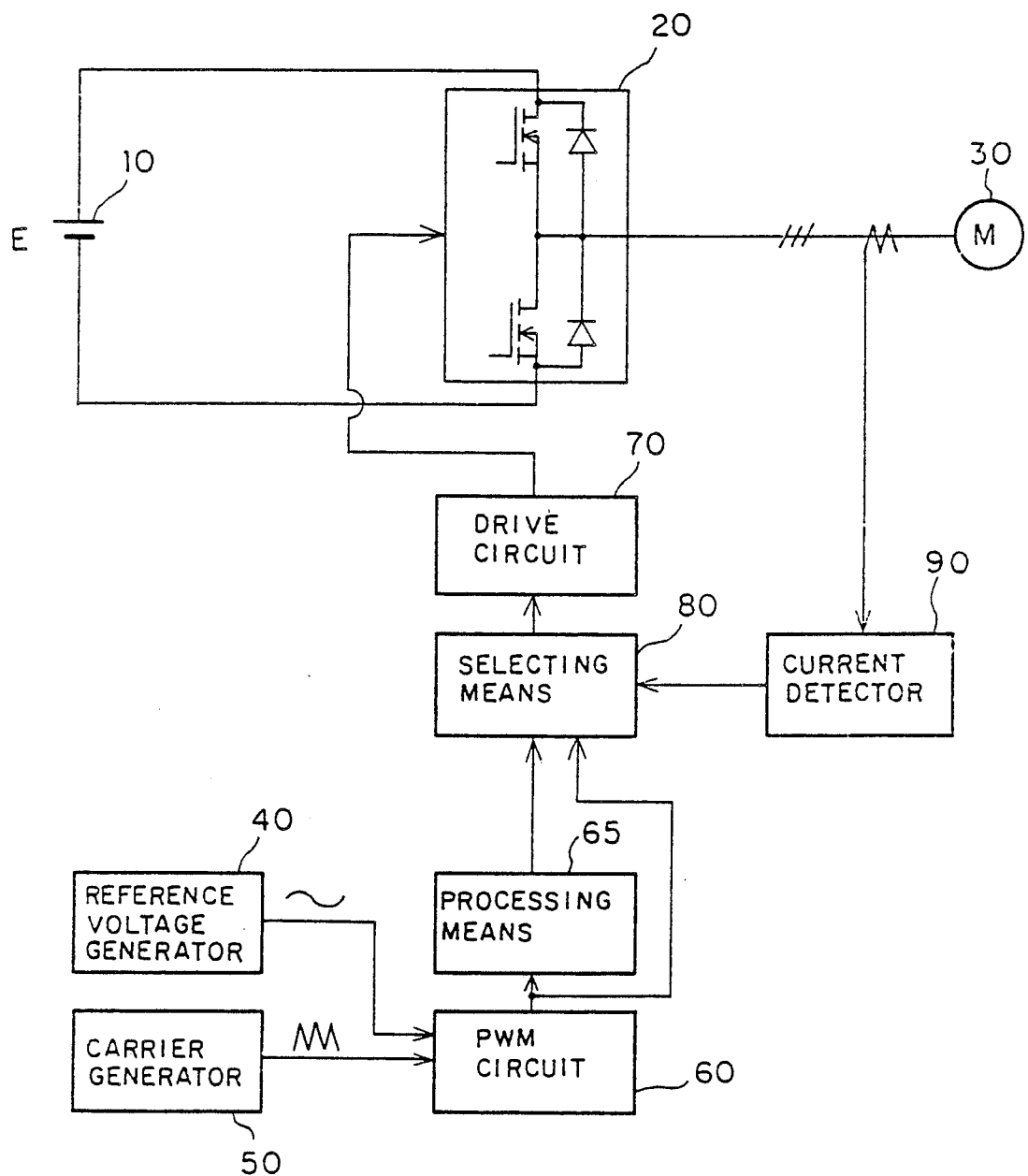
FIG. 1 is a block diagram showing the construction of a pulse-width modulation type inverter apparatus according to a first embodiment of this invention.

A first embodiment of this invention will hereinafter be described with reference to the accompanying drawings. Referring now to FIG. 1, designated at numeral 80 is a selecting means which is adapted to receive either of a PWM signal to which short-prevention processing has been made from a processing means 65 and a PWM signal from a PWM circuit 60, to which no short-prevention processing is made and to judge whether or not the output current falls within substantially zero level region and it is positive or negative, based on a signal from a current detector 90, for selecting a switching signal, which effectively acts on each of the controllable switching elements with respect to individual phases, from the result of the above judgement so as to supply the same to a drive circuit 70.

Figure 16:
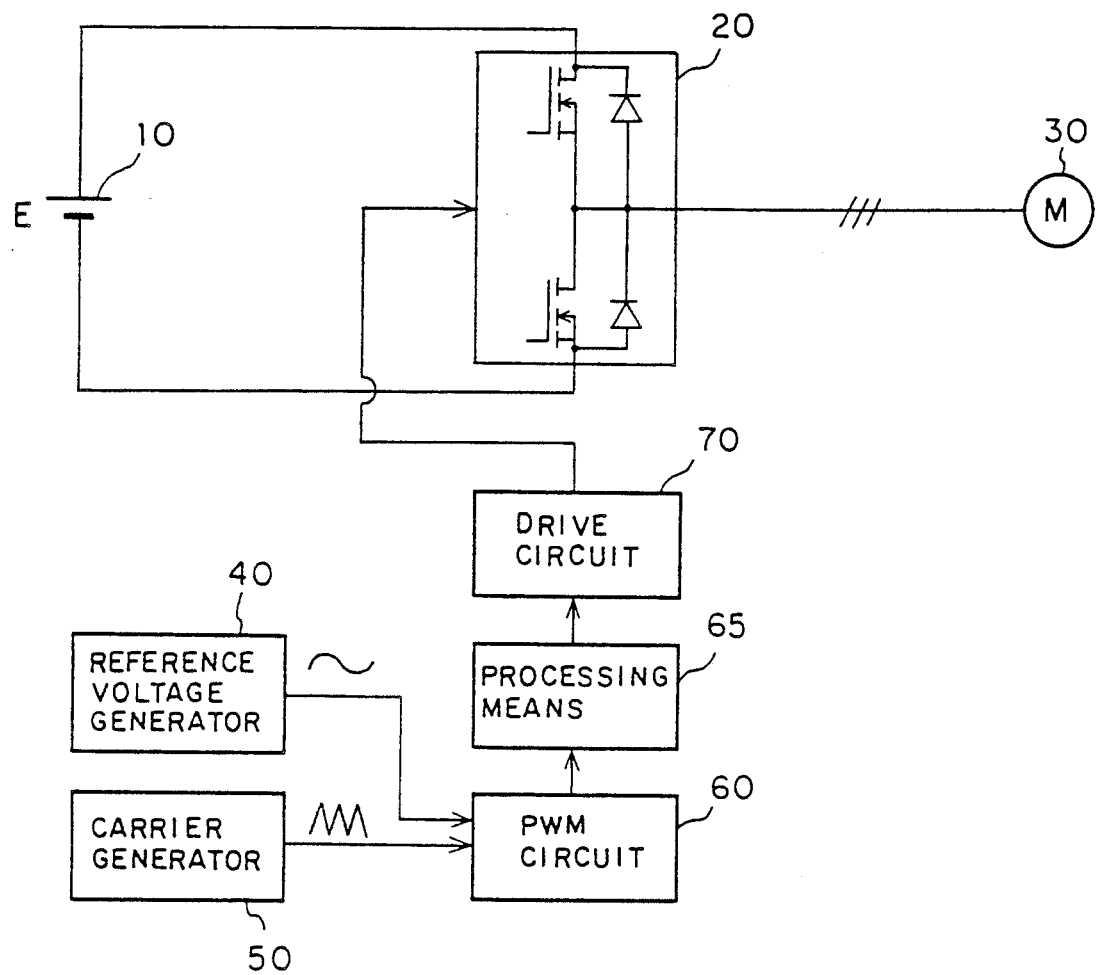
FIG. 16 is a block diagram showing the conventional pulse-width modulation type inverter apparatus.
Figure 17:
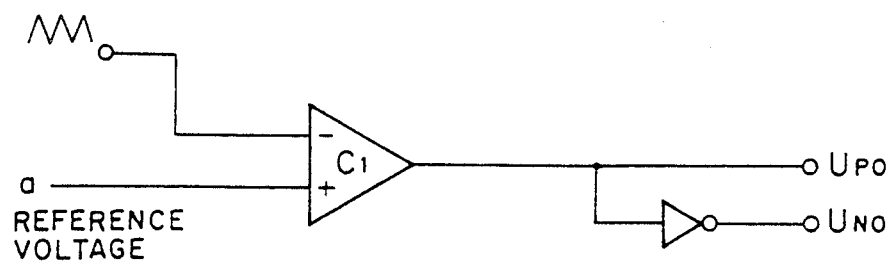
FIG. 17 is a circuit diagram for generating a PWM control signal.
Figure 24:
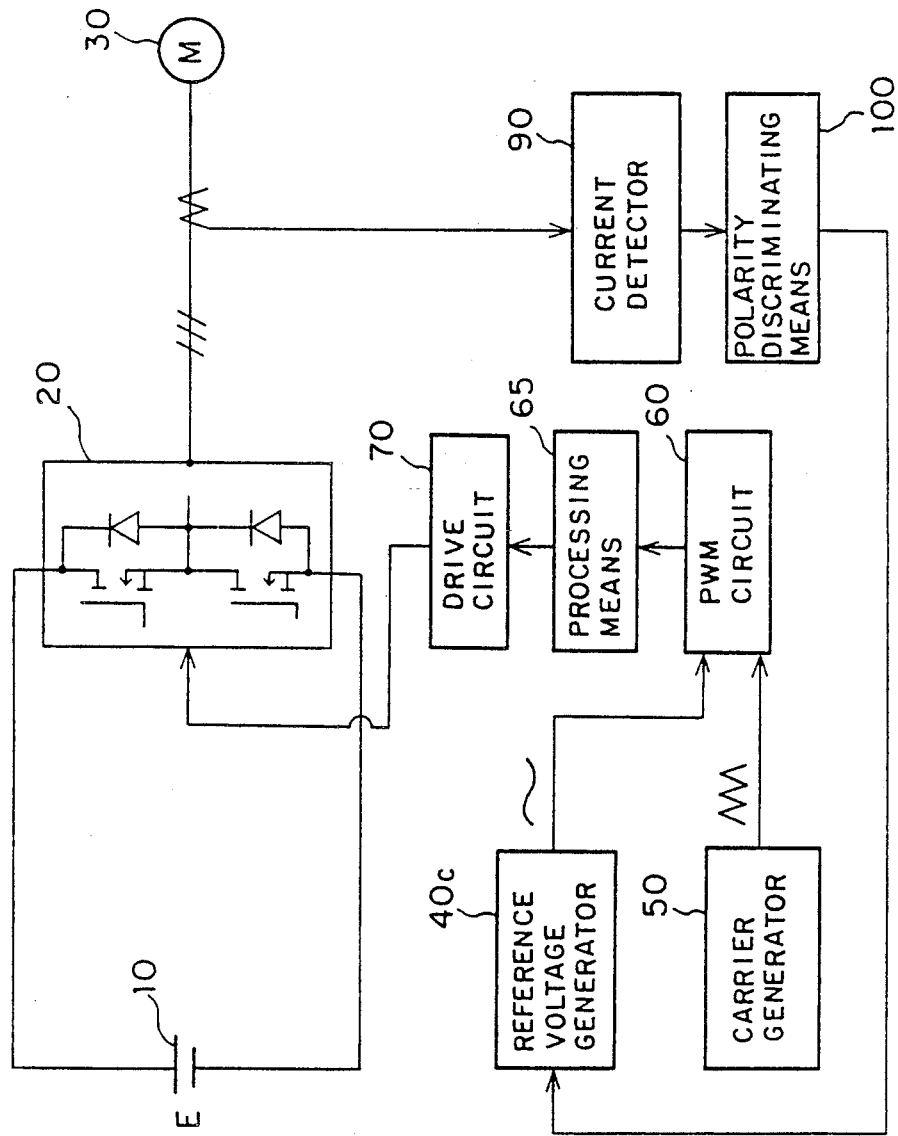
FIG. 24 is a block diagram illustrating the construction of a further conventional pulse-width modulation type inverter apparatus.
Figure 25:
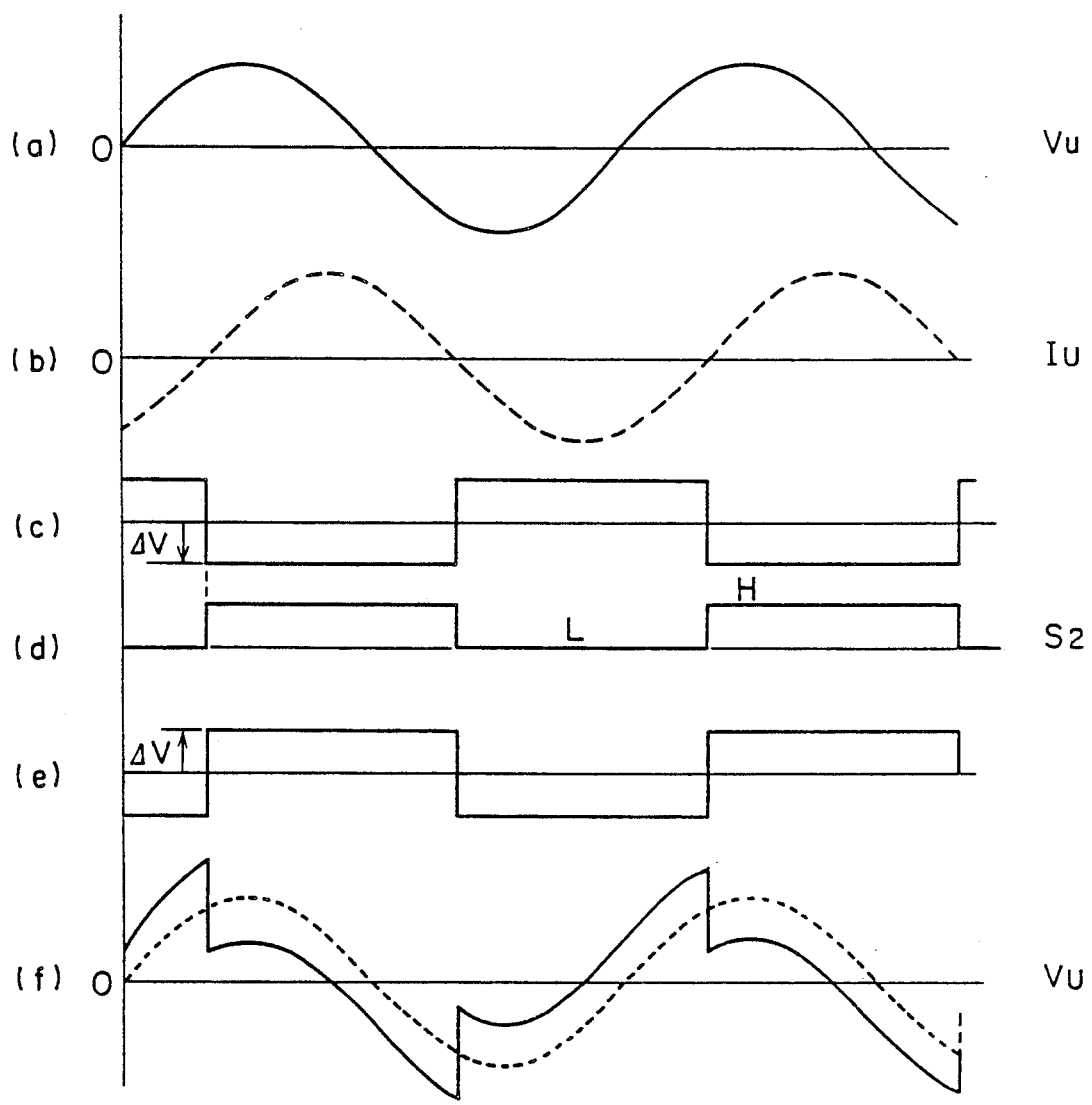
FIG. 25 is a graphic representation of waveform for describing the manner of correction of waveform distortion which appears at the waveform of an output voltage produced during the short-prevention period $T_d$ in the conventional pulse-width modulation type inverter apparatus of FIG. 24.

Incidentally, in the same drawing, the same elements of structure as those in a conventional example shown in FIG. 16 or 24 are identified by like reference numerals and their description will therefore be omitted herein.

Figure 2:
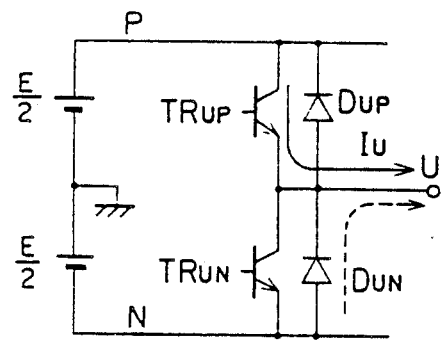
FIG. 2 a circuit diagram for describing the operation of each of switching elements.
Figure 2:
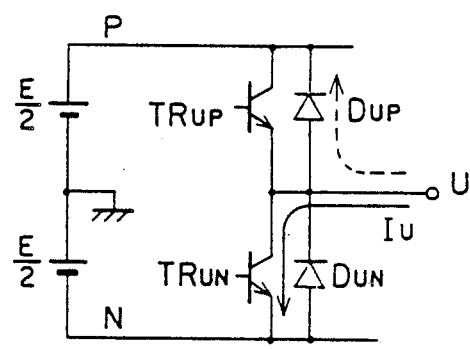

A description will next be made on the operation of the first embodiment. FIG. 2 is a circuit diagram of an inverter output unit which operates under a U phase, in which FIG. 2(a) shows a circuit diagram of the output unit in the case where output current $I_U$ is positive ($I_U>0$) and FIG. 2(b) depicts a circuit diagram of the output unit in the case where output current $I_U$ is negative ($I_U<0$).

Now assuming that an upper-side transistor $TR_{UP}$ as a controllable switching element as shown in FIG. 2(a) is in an ON state and the output current $I_U$ flows through the circuit in the form of a positive polarity. In this case, needless to say, a lower-side transistor $TR_{UN}$ is in an OFF state. At this time, the potential corresponding to the U phase at an output terminal U becomes equal to E/2 as the output terminal is electrically connected to a d.c. bus P through the transistor $TR_{UP}$.

When the transistor $TR_{UP}$ is next brought into an OFF state, the output current $I_U$ will continue to flow in the same direction, so that it flows by way of a lower-side diode $D_{UN}$. At this time, the potential at the output terminal U becomes $-E/2$ because it is connected to a d.c. bus N through to conduction of the diode $D_{UN}$.

Then, after the short-prevention period $T_d$ has elapsed, the transistor $TR_{UN}$ is turned on. However, the output current $I_U$ continues to flow by way of the diode $D_{UN}$ in spite of turn-on of the transistor $TR_{UN}$. Therefore, the potential at the output terminal U till remains $-E/2$. Then, even when the transistor $TR_{UN}$ is brought into an OFF state, the potential at the output terminal U remains unchanged. When the transistor $TR_{UP}$ is turned on after the short-prevention period $T_d$ has elapsed, the output current $I_U$ flows into the transistor $TR_{UP}$, so that the potential at the output terminal U is brought to E/2. Similarly, the above-described operations are applied to those executed at V and W phases.

Let's next assume that as shown in FIG. 2(b), the transistor $TR_{UN}$ is in an ON state and output current $I_U$ flows in the circuit in the form of negative polarity. In this case, needless to say, the transistor $TR_{UP}$ is in an OFF state. At this time, the potential of the U phase at an output terminal U is equal to $-E/2$ because the output terminal is electrically connected to a d.c. bus N through conductor the transistor $TR_{UN}$.

Then, when the transistor $TR_{UN}$ is turned on, the output current $I_U$ will continue to flow in the same direction, so that it flows in the circuit by way of upper-side diode $D_{UP}$. At this time, the potential at the output terminal U becomes E/2 because the output terminal U is electrically connected to a d.c. bus through to conduction of the diode $D_{UP}$.

Then, the transistor $TR_{UP}$ is turned on after the short-prevention period $T_d$ has elapsed. However, the output current $I_U$ continues to flow through the diode $D_{UP}$ in spite of turn-on of the transistor $TR_{UP}$, so that the potential at the output terminal U remains E/2. Then, the potential at the output terminal U remains unchanged in spite of turn-off of the transistor $TR_{UP}$.

When the transistor $TR_{UN}$ is then turned on after the short-prevention period $T_d$ has elapsed, the output current $I_U$ flows into the transistor $TR_{UN}$, so that the potential at the output terminal U is changed to $-E/2$. Similarly, the operation referred to above is applied to that at each of the V and W phases.

In other words, the output current is controlled at the timing of switching of the upper-side controllable element regardless of the timing of switching of the lower-side controllable element as long as the output current is kept in a positive-polarity state. In addition, the output current is governed at the timing of switching of the lower-side controllable element regardless of the timing of switching of the upper-side controllable element as long as the output current is kept in a negative-polarity state.

Thus, if the polarity of the output current has already been established, i.e., where the polarity of the output current is positive, it is only necessary to make a switching operation with respect to the upper-side controllable element alone, i.e., turn on and off the upper-side controllable element alone. On the other hand, where the polarity of the output current is negative, it is only necessary to turn on and off the lower-side controllable element alone. Where the level of the output current is small and its polarity changes during switching operation, or in regions where the level of the output current is small and its polarity cannot be specified, it is only necessary to complementarily turn on and off the upper-side and lower-side controllable elements.

In other words, in a region where the polarity of the output current has assuredly been established, its associated controllable element is driven with the PWM signal prior to the short-prevention processing. In a region other than said region, the upper-side and lower-side controllable elements are driven with the PWM signal subsequent to the short-prevention processing.

Figure 18:
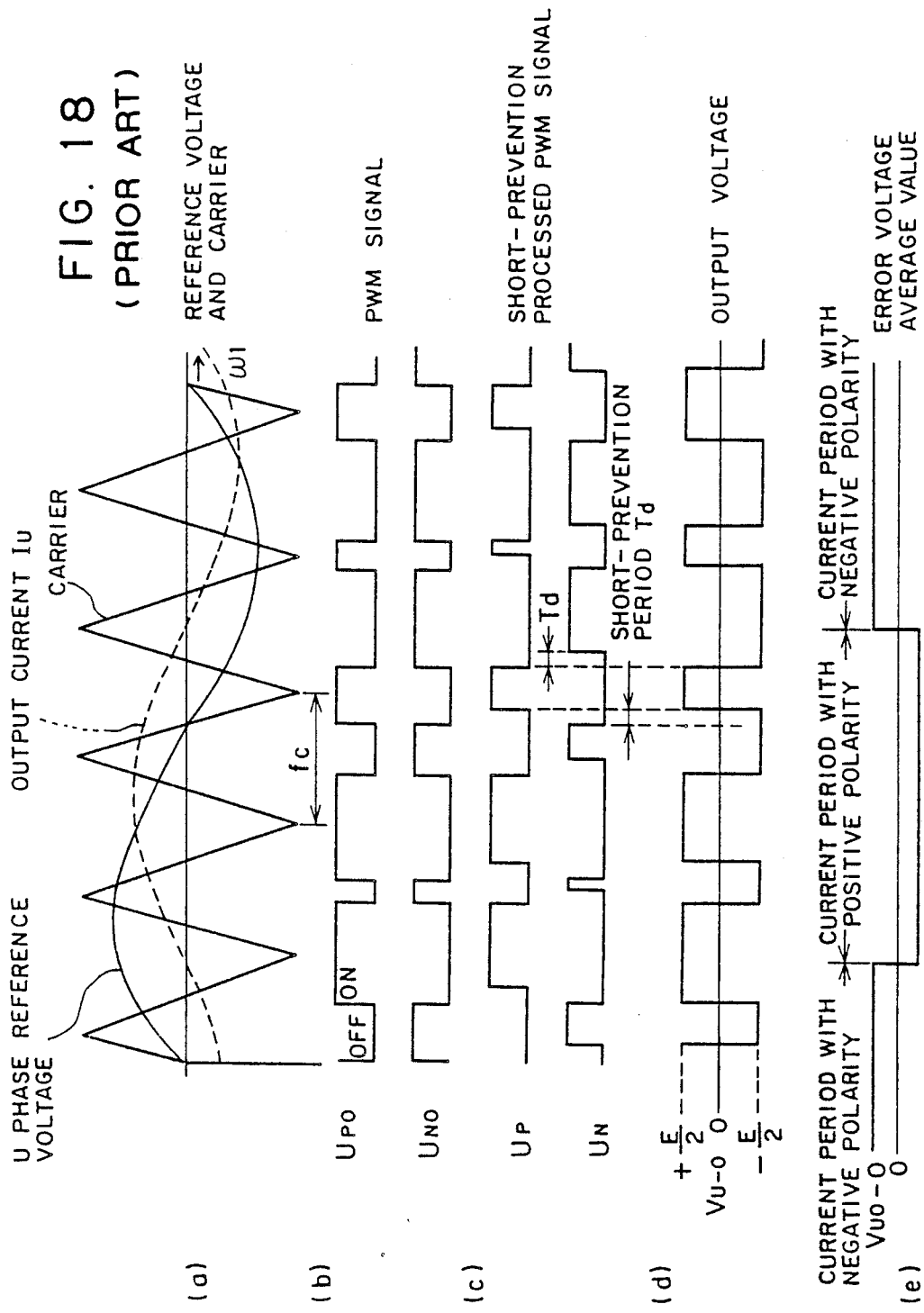
FIG. 18 is waveforms for describing the operation of the conventional pulse-width modulation type inverter apparatus.
Figure 19:
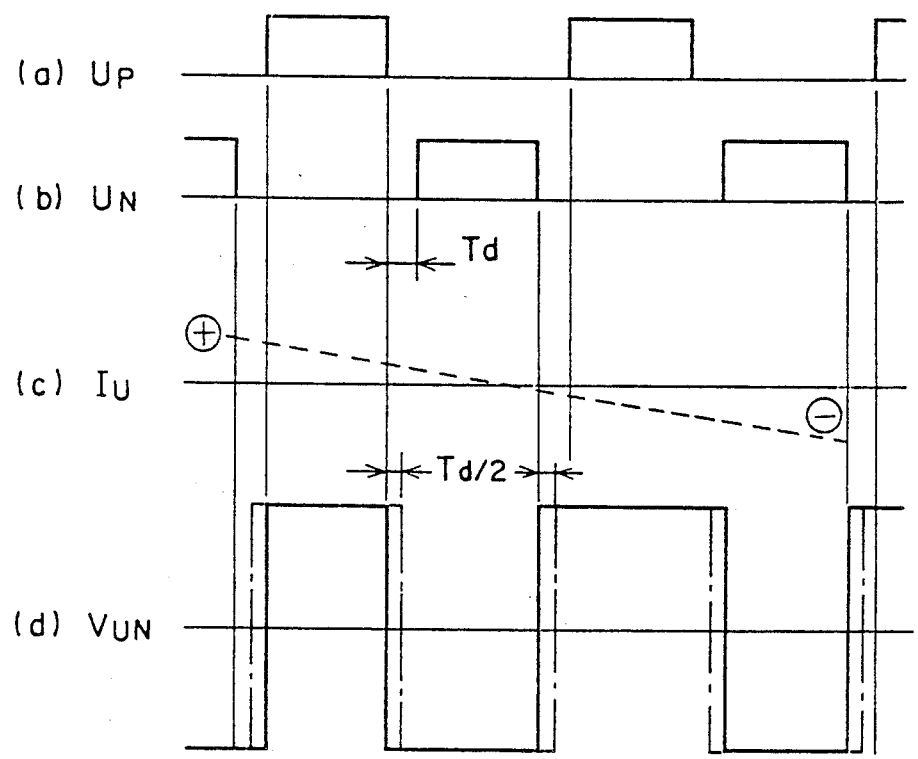
FIGS. 19 and 20 are waveforms for describing waveform distortion which appears at the waveform of an output voltage produced during a short-prevention period $T_d$ as shown in FIG. 18.
Figure 20:
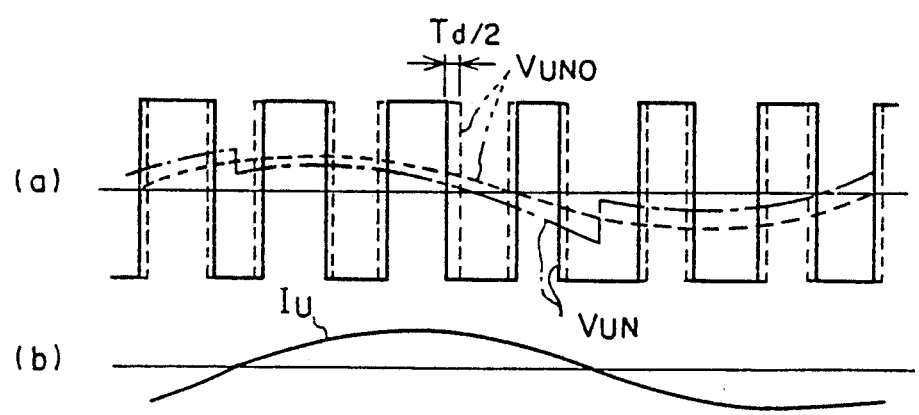

The above-described operation will next be described in detail with reference to FIG. 1. When a reference voltage having such a waveform as shown in FIG. 18(a) is outputted from a reference voltage generator 40 and a carrier having such a waveform as depicted in FIG. 18(a) is generated by a carrier generator 50, PWM signals $U_{PO}, U_{NO}$ depicted in FIG. 18(b) are generated based on the reference voltage and the carrier by the PWM circuit 60. In addition, the short-prevention processed PWM signals $U_p, U_N$ shown in FIG. 18(c) are produced by the processing means 65 based on the PWM signals $U_{PO}, U_{NO}$.

Assuming now that the output current $I_U$ flows in such a state as illustrated in FIG. 18(a), the current detector 90 serves to detect this current and supplies the result of detection to the selecting means 80. Then, the selecting means 80 executes the following operations in response to the signal thus detected.

Assuming that the output current $I_U$ is sufficiently large and assumes negative polarity, the output current $I_U$ falls under the control of switching operation of the lower-side controllable element. Thus, the PWM signal $U_{NO}$ prior to the short-prevention processing is selected but the PWM signal $U_{PO}$ at the upper-side controllable element is not chosen, so that transistor $TR_{UP}$ is brought into an off state.

Then, when the output current $I_U$ approaches a value in the vicinity of zero level to be intersected therewith and then becomes substantially zero level, the short-prevention processed PWM signals $U_P, U_N$ are selected. Where the output current $I_U$ is next increased and changed from the negative polarity to the positive polarity for assuredly establishing the polarity state of the output current the output current $I_U$ falls under the control of switching operation of the upper-side controllable element in such a region. Thus, the PWM signal $U_{PO}$ prior to the short-prevention processing is selected but the PWM signal $U_{NO}$ the lower-side controllable element is not chosen, so that transistor $TR_{UP}$ is rendered off. Even if the conditions of a load or the like change and the output current $I_U$ varies correspondingly, the same selection operation is made. Incidentally, operation similar to that described above is executed with respect to V and W phases.

Then, the drive circuit 70 performs a switching operation of the upper and lower controllable elements in response to the signal from the selecting means 80, thereby to drive an electric motor 30 at the variable speed. Thus, an output voltage corresponding to the reference voltage waveform can be obtained without being affected by the short-prevention period $T_d$ within a period during which the polarity of an output current has been established. The electric motor 30 is driven by a PWM signal subsequent to the short-prevention processing within a period during which the output current falls within substantially zero level. Therefore, the output current is affected by the short-prevention period $T_d$. This period is extremely short compared with the period during which the polarity of the output current has been established. In addition, the period during which the output current falls within the substantially zero level can further be compressed if carrier frequencies are high, the ripple current is small and the output current is in the form of a smoother sine wave. Thus, the output current is hardly affected by the short-prevention period, considered as a whole. Accordingly, the distortion of the output voltage, reduction in the output voltage, torque ripples, irregularity in rotation, etc. do not occur and high stability can be achieved.

Figure 3:
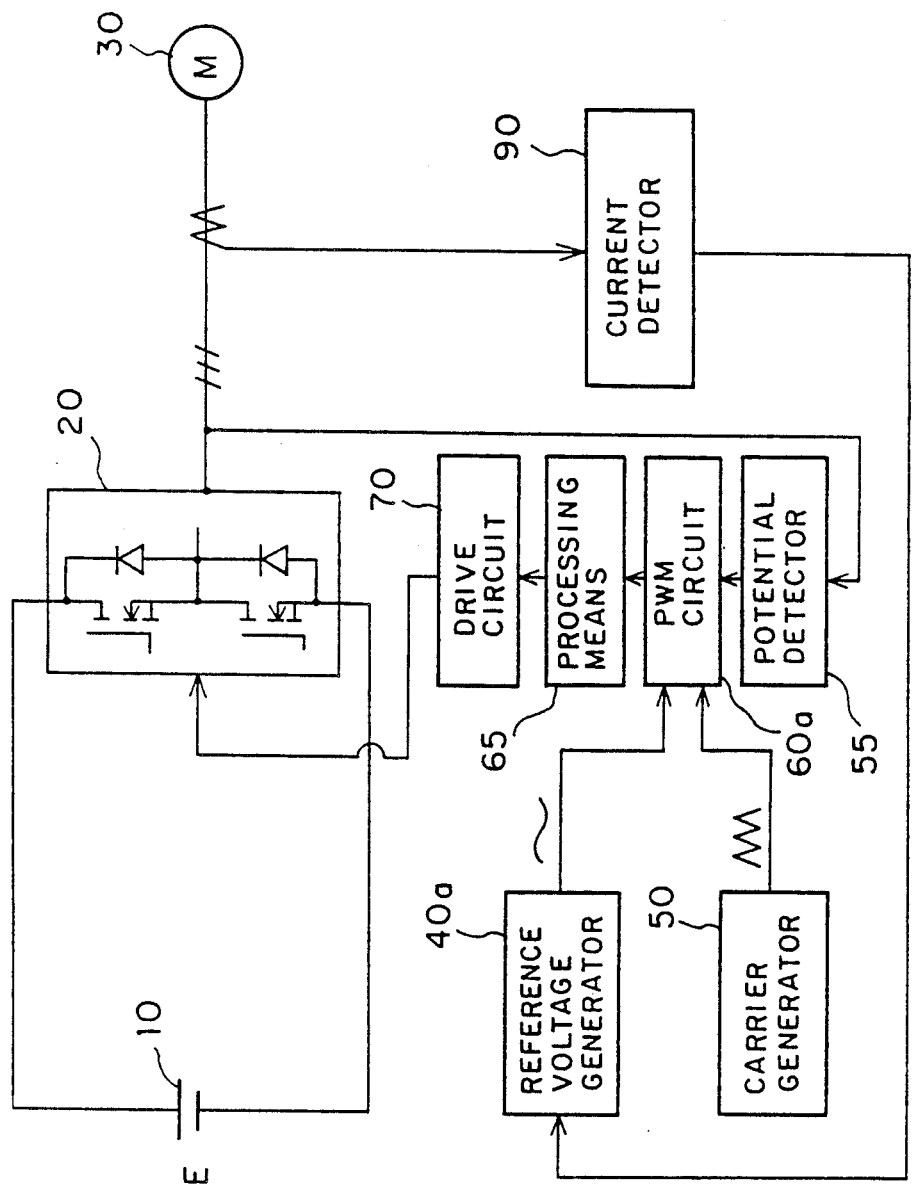
FIG. 3 is a block diagram depicting the construction of a pulse-width modulation type inverter apparatus according to a second embodiment of this invention.

A description will next be made of the second embodiment of this invention with reference to FIG. 3. In FIG. 3, numeral 90 indicates a current detector for detecting the level of output current from an inverter and numeral 40a indicates a reference voltage generator, as a reference signal generating means, for outputting a waveform that indicates a reference voltage as a reference of an output frequency or output voltage. This waveform is one for making maximum a period corresponding to $\pi/3$(rad) during a half cycle so as to saturate the same to be positive or negative, thereby controlling the remaining two phases (so-called two-arm modulation control). Thus, this reference voltage generator serves to make the saturated period during the half cycle correspond substantially to the period indicative of zero level of the output current in response to each output from the current detector 90.

Figure 21:
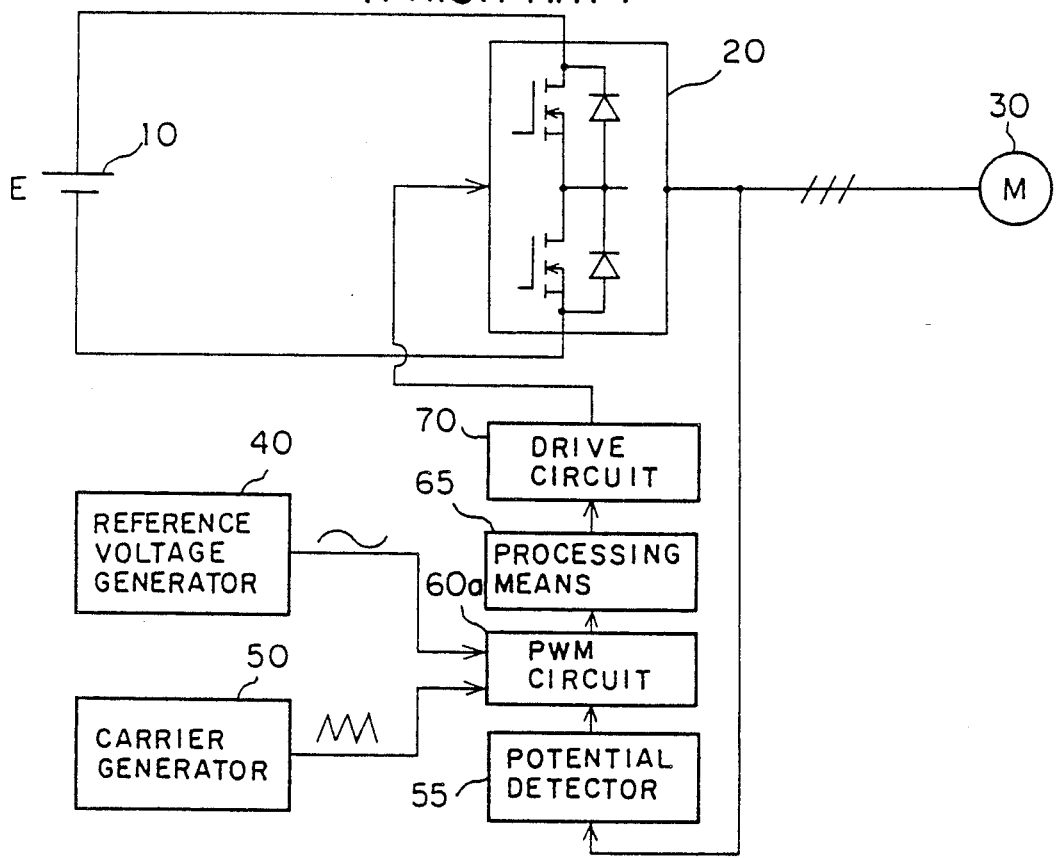
FIG. 21 is a block diagram showing the construction of another conventional pulse-width modulation type inverter apparatus.
Figure 22:
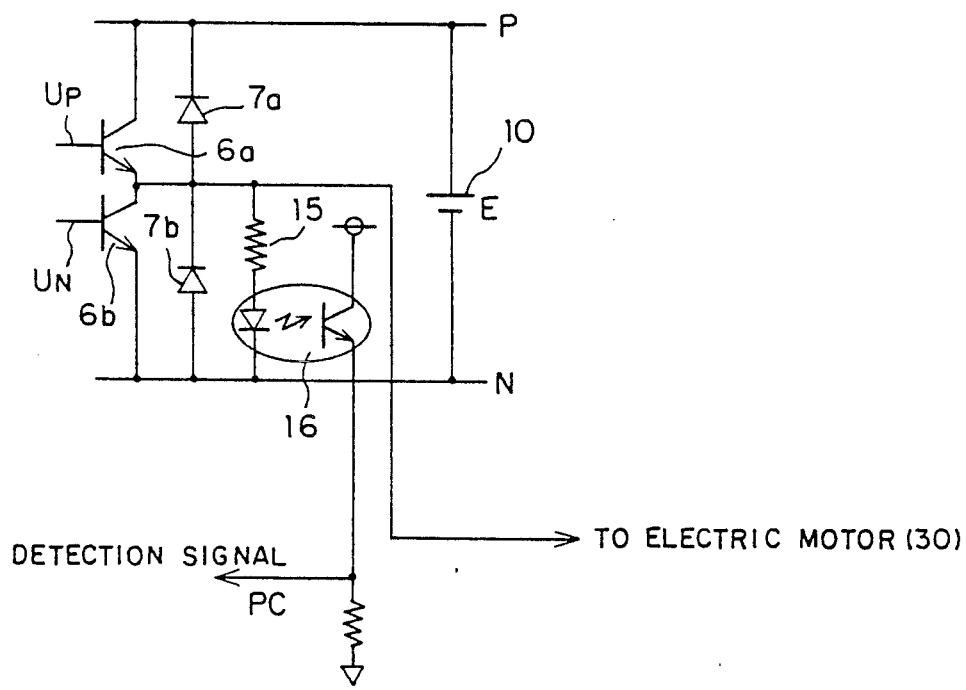
FIG. 22 is a circuit diagram of a potential detector employed in the conventional pulse-width modulation type inverter apparatus of FIG. 21.
Figure 23:
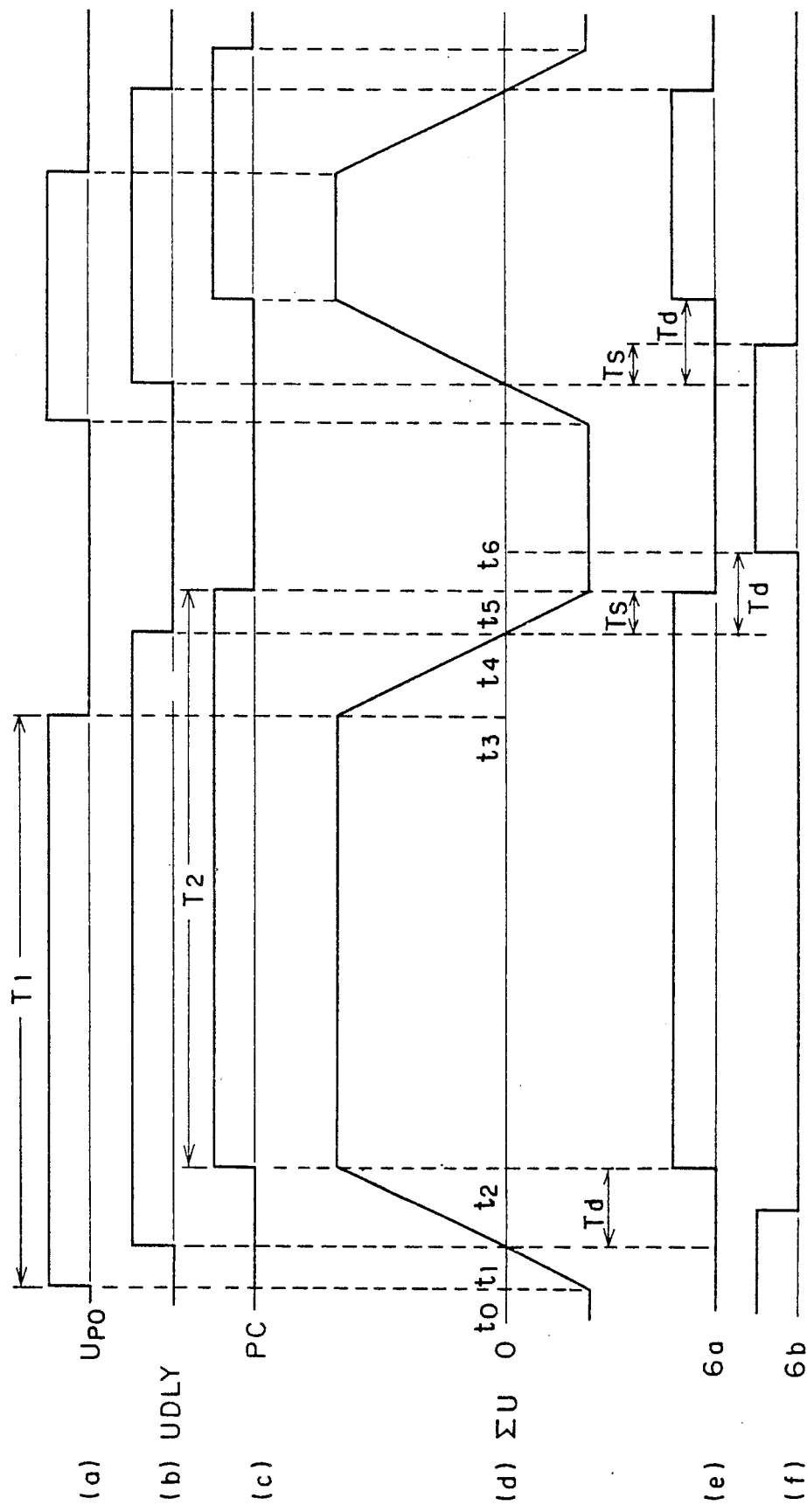
FIG. 23 is a graphic representation of waveforms for describing the manner of correction of waveform distortion which appears at the waveform of an output voltage produced during the short-prevention period $T_d$ in the conventional pulse width modulation type inverter apparatus of FIG. 21.

Incidentally, in the same drawing, the same elements of structure as those in a conventional example shown in FIG. 21 are identified by like reference numerals and their description will therefore be omitted herein.

Figure 4:
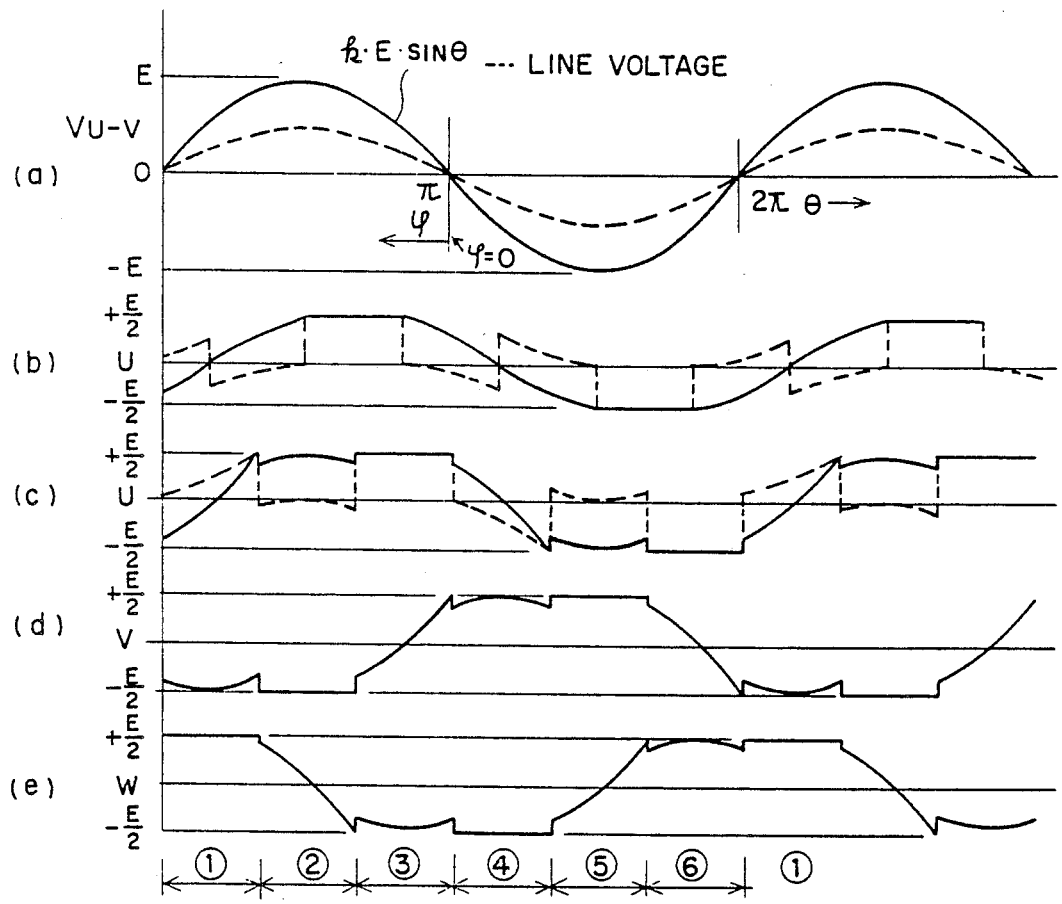
FIGS. 4 through 6 are waveforms for describing the operation of the second embodiment of this invention.

A description will next be made of the operation of the second embodiment. First of all, a method of production of each waveform indicative of the reference voltage employed in the two-arm modulation mode will be described with reference to FIG. 4. FIG. 4(a) is a graphic representation of the shape of a wave that indicates a voltage $V_{U-V}$ between U and V, out of waves indicative of line voltages to be outputted. The solid line represents an example in which the voltage control rate is equal to 1 (k=1) and the broken line shows an example in which the rate is equal to 0.5 (k=0.5). This voltage U-V is expressed by k E sin $\theta$, where E represents a d.c. bus line voltage and a U-phase reference voltage $U(\theta)$ for generating the voltage $V_{U-V}$ between U and V phases is expressed by the equation depicted by FIG. 4(f).

$V(\theta)$ and $W(\theta)$ can be obtained by shifting $U(\theta)$ $2\pi/3$ and $4\pi/3$ in radians, respectively.

The phase at $\phi=0$(rad) will next be defined as shown in FIG. 4(a). In this case, FIGS. 4(c), 4(d) and 4(e) are representative of phases at $\phi=0$(rad) by way of an illustrative example. FIGS. 4(c), 4(d) and 4(e) show waveshapes at the reference voltages $U(\theta)$, $V(\theta)$ and $W(\theta)$ respectively. FIG. 4(b) shows an example representative of a waveshape at the reference voltage $U(\theta)$ when $\phi=\pi/6$(rad).

This $\phi$ may be in the range from 0 to $\pi/3$(rad) as is understood from the relationship between FIGS. 5(a) and 5(b). The relational expressions shown in FIG. 4(f) are each given as the general formula by fixing $\phi$ out of $\theta'=\phi+\pi$ to each of 0 to $\pi/3$(rad).

As understood from FIG. 5(a), for example, a period in which a voltage corresponding to the U phase represents the maximum with respect to the V and W phases corresponds to $2\pi/3$(rad), while its minimal period also corresponds to $2\pi/3$(rad). In order to obtain the above maximal and minimal periods, it is only necessary to saturate the U phase to be positive or negative and then determine other two phases [saturation: they may be fixed to E/2 or −E/2 in this case]. The switching operation of a controllable element is stopped by turning on or off a PWM signal within those periods because the crest value of a wave of a carrier frequency falls between E/2 and −E/2 as shown in FIG. 4(f). However, each of the periods in which the U phase is to be saturated so as to be positive or negative becomes $\pi/3$(rad) at the maximum because three phases are determined in the above-described manner [each period becomes $\pi/3$ at the maximum because of division of the periods to be saturated with the three phases for each half cycle, i.e., $\pi$(rad)]. Thus, $\pi$ is in the range of 0 to $\pi/3$(rad).

Incidentally, the way of obtaining a variable voltage and a variable frequency as an output is the same as the two-arm modulation control method. Namely, it is only necessary to control the voltage control rate k in the case of voltage control and to control the phase-angle velocity in the case of frequency control.

Figure 5:
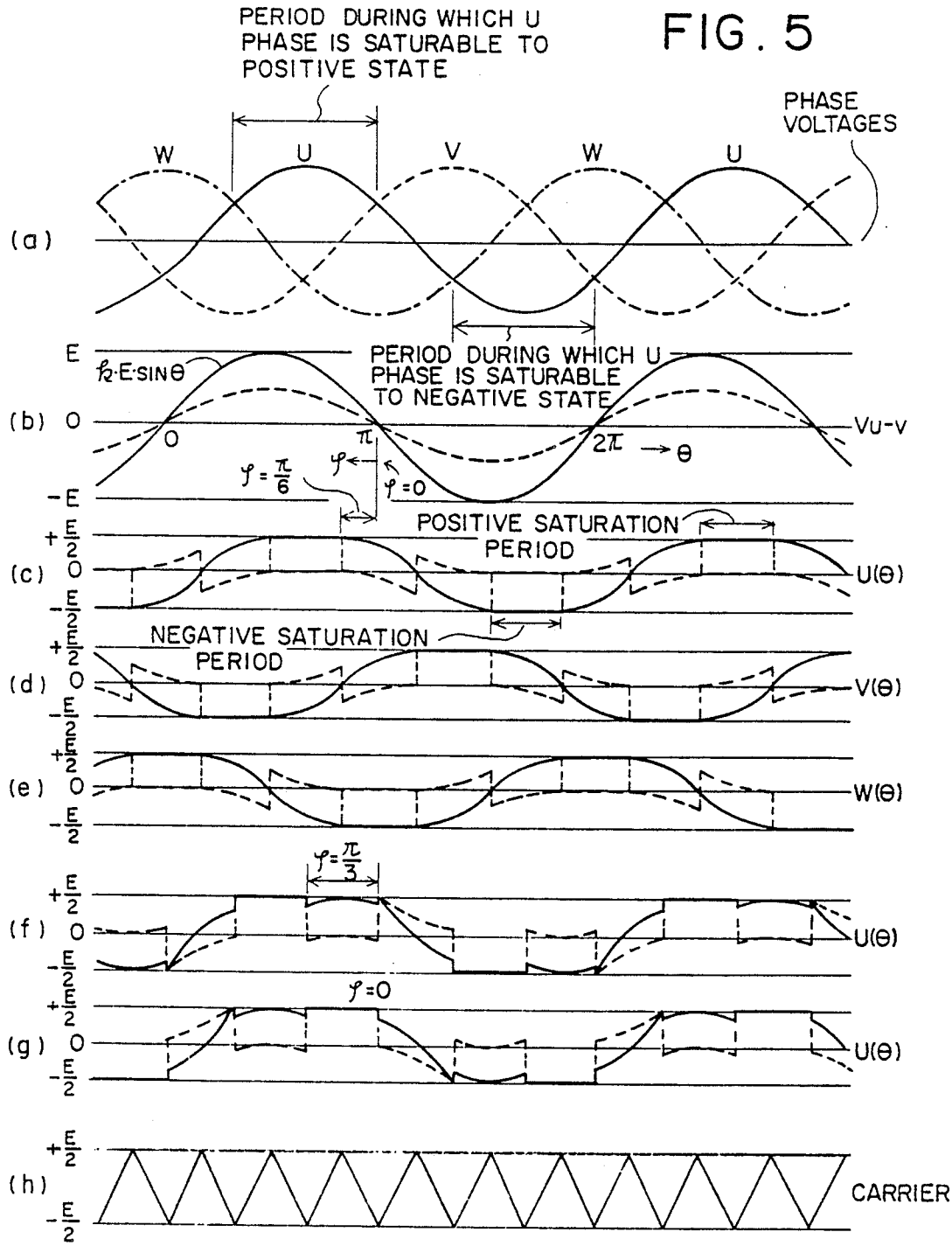

FIGS. 5 is a graphic representation of the shapes of each wave at the reference voltages under the two-arm modulation control, similarly to FIG. 4.

In FIG. 5, FIG. 5(a) shows each phase voltage and the range within which each of the phases is saturable into a positive or negative state. FIG. 5(b) is the same as FIG. 4(a). FIGS. 5(c), 5(d) and 5(e) are waveforms of reference voltages U($\theta$), V($\theta$) and W($\theta$) corresponding to the U, V and W phases in the case where $\phi = \pi/6$(rad). FIG. 5(f) is a waveform of the reference voltage U($\theta$) in the case where $\phi = \pi/3$(rad), and FIG. 5(g) is a waveform of the reference voltage U($\theta$) in the case where =0(rad). FIG. 5(h) is a graphic representation of a carrier frequency wave and depicts a case where six waveforms are included within one cycle out of each output from the inverter for the brevity of description.

The waveforms at the reference voltages with respect to the respective phases employed in the two arm modulation control method can be determined in the above-described manner. It has here been clear that the period of $\phi$ can have the degree of freedom from $\phi = 0$ to $\pi/3$(rad) even in the case of use of the same two-arm control.

The operation of the present embodiment will hereinafter be described with reference to FIGS. 3 and 6.

FIGS. 6(a) and 6(b) are the same as FIGS. 5(a) and 5(b). FIG. 6(c) is a waveform of a reference voltage U($\theta$) at the time when $\phi = \pi/3$(rad). FIG. 6(d) is a waveform of the reference voltage U($\theta$) at the time when $\phi = \pi/6$(rad) and FIG. 6(e) is a waveform of L reference voltage U($\theta$) at the time when $\phi = 0$(rad). FIGS. 6(f), 6(g) and 6(h) are graphic representation of the shapes of waves that indicate current corresponding to the U phase and each show the state of different power factor.

Let's now assume that a PWM signal is generated under the condition of a certain frequency and voltage so as to drive the electric motor 30. At this time, let's further assume that the load is relatively small and the U-phase output current flows as shown in FIC 6 (g). Then, the current detector 90 detects this state ' here-after, the reference voltage generator 40a serves to receive the signal from the current detector 90 for generating the waveform indicative of the reference voltage illustrated in FIG. 6(d) in such a way that the reference voltage is saturated within the region of substantially zero level of the output current, thereby to output the result to the PWM circuit 60 a. As a consequence, the PWM control is achieved based on an output from the PWM circuit 60a. Assuming next that the load is rendered high thereby to make the power factor greater and the output current corresponding to the U phase flows as shown in FIG. 6(f). In this case, the reference voltage generator 40a generates a waveform representative of a reference voltage, which is shown in FIG. 6(c), in response to the output from the current detector 90, thereby to supply the result to the PWM circuit 60 a.

Thus, the PWM circuit 60a generates a PWM signal based on the waveform indicative of the reference voltage, which has been produced in the above-described manner, an output from the carrier generator 50 and an output from a potential detector 55. Each of the waveforms indicative of the reference voltages is generated such that a time interval during which the output current is substantially zero level is saturated as described above. Thus, the switching operation of a controllable element is brought into a stop state between a time interval during which the logic level of the output voltage is uncertain. It is unnecessary to correct the influence of the short prevention period. Similarly to the conventional example, it is practiced to correct the influence of the short-prevention period $T_d$ in response to an output from the potential detector 55 with respect to a time interval during which the logic level of the output voltage is established. It is thus possible to always correct the influence of the short-prevention period $T_d$ even at any state of applied loads or any state of the power factor. Thus, an ideal operation of the electric motor can be realized without any detectable formation of the reduction in voltage, distortion in voltage, torque ripples, irregularity of rotation, etc.

Figure 7:
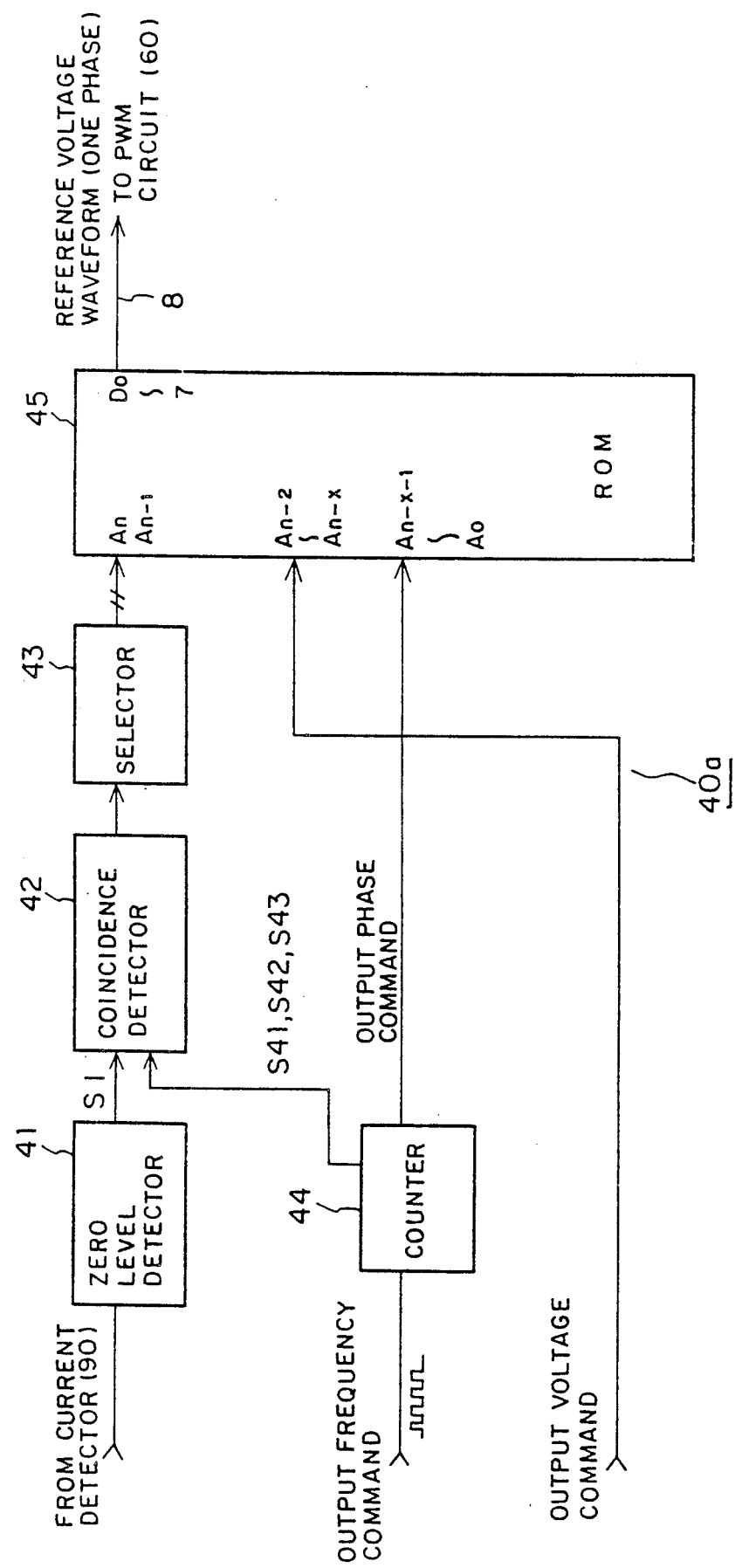
FIG. 7 is a circuit diagram showing a reference voltage generator according to the second embodiment of this invention.

FIG. 7 shows one example in which the reference voltage generator 40a having the above-described functions is constructed by a digital circuit. For the brevity of description, FIG. 7 depicts one example of a reference voltage generator 40a in the case where a single phase is used. Designated at numeral 41 is a zero level detector for detecting a period of substantially zero level in response to an output from a current detector 90 so as to supply the detected signal S1 to a coincidence detector 42. Numeral 44 indicates a counter for counting a clock of an output frequency command (which is to be given as a clock) from the inverter to generate an inverter output phase command therefrom, thereby to supply the same to a ROM 45, and for generating signals S41, S42 and S43 for reference waveform periods, corresponding to the time interval during which output current is the substantially zero level, so as to supply them to the coincidence detector 42, where S41 is a correspondence signal for selecting a waveform indicative of the reference voltage at the time of $\phi = \pi/3$(rad), S42 is a correspondence signal for selecting a waveform indicative of the reference voltage at the time of $\phi = \pi/6$(rad), S43 is a correspondence signal for selecting a waveform indicative of the reference voltage at the time of $\phi = 0$(rad).

Thus, the coincidence detector 42 serves to determine which signal out of the signals S41, S42 and S43 corresponds to a time interval during which the present output current falls within substantially zero level, in response to the outputs from the zero level detector and the counter 44, thereby to output one of signals. Numeral 43 indicates a selector for selecting each address in the ROM 45, in which data about the waveforms indicative of the reference voltages at the time of $\phi = \pi/33$(rad), $\phi = /6$(rad) and $\phi = 0$(rad) has been stored, in response to each output from the coincidence detector 42. For example, when the time interval representing the substantially zero level corresponds to the signal S41, the selector selects the address (An,An−1)=(0,0). Likewise, when the time interval corresponds to the signal S42, it selects the address (An,An−1)=(0,1) and when the time interval corresponds to the signal S43, it selects the address (An,An−1)=(1,0). Designated at numeral 45 is a ROM in which data about the waveforms representing the reference voltages have been stored therein, which in turn stores, in a 8-bit binary form, the data about the waveforms representative of the reference voltages, which correspond to addresses representative information (An,An−1) about the time interval of the substantially zero level of the output current from the selector 43, an inverter output voltage command (An−2−An−x) and of an output phase command (An−x−1−AO). FIG. 8 shows one example of a format including the above data.

Figure 9:
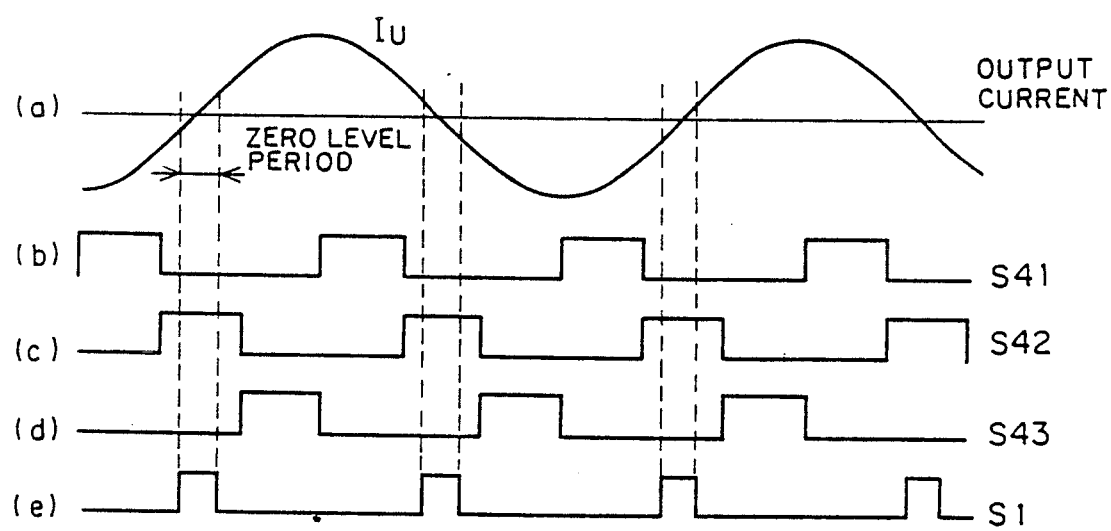
FIG. 9 is a graphic representation of the waveform shapes that indicate the operation of the reference voltage generator according to the second embodiment of this invention.
Figure 10:
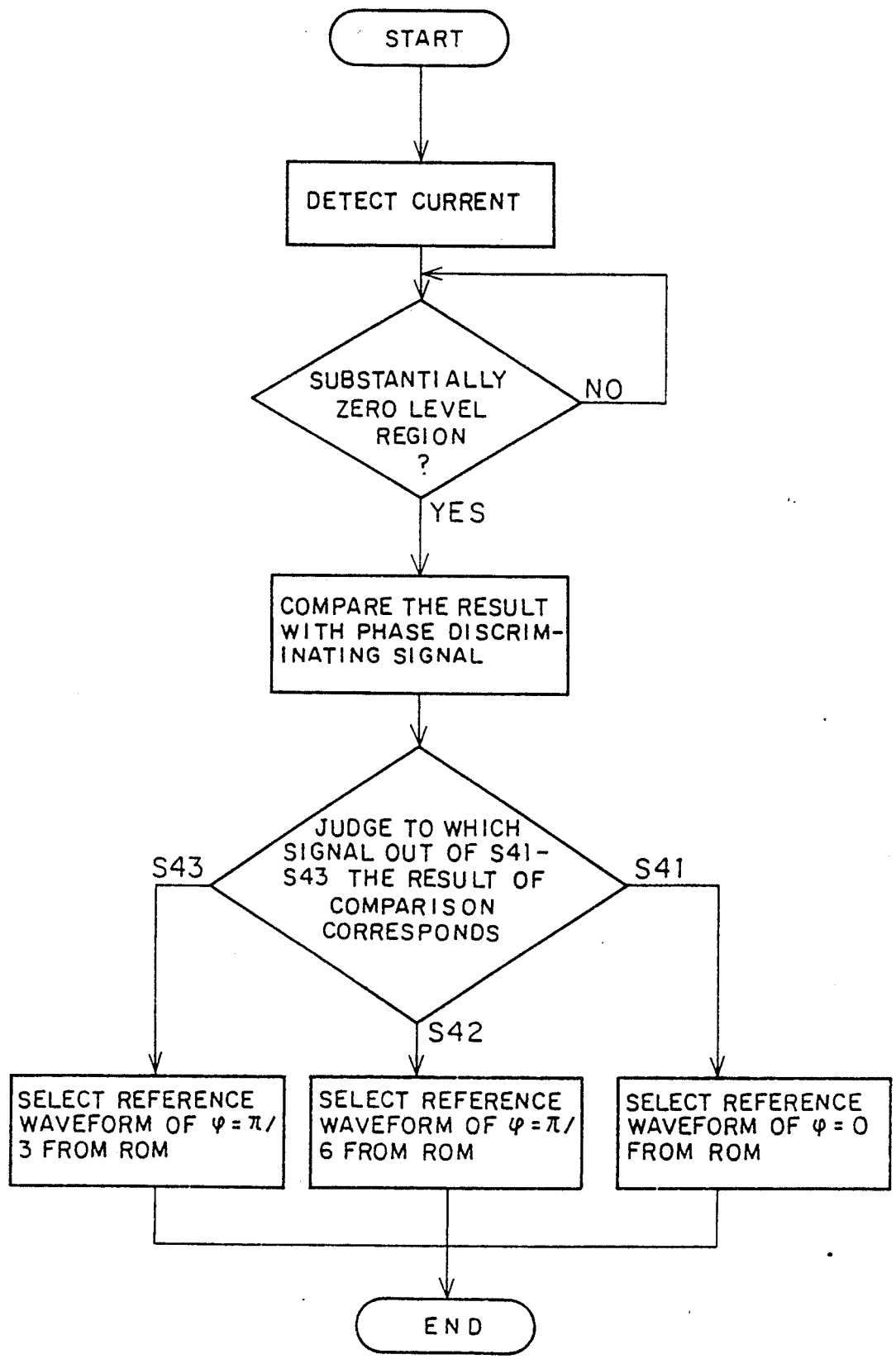
FIG. 10 is a flow chart for describing the operation of the second embodiment of this invention.

FIG. 9 is a graphic representation of the shapes of waves that indicate the operation of the reference voltage generator. In this case, the signal Sl corresponding to the time interval during which the detected output current falls within the substantially zero level coincides with the signal S42 out of the signals S41, S42 and S43. At this time, the selector 43 outputs the address (Ah,Ah−1)=(0,1). Then, the ROM 45 selects the waveform representative of the reference voltage at the time that $\phi = \pi/6$(rad) to supply the same to the PWM circuit 60a. Similarly, the same operation as described above is also performed with respect to the other phases. The flow chart of operation of the present embodiment with respect to the other phases will be shown in FIG. 10.

Figure 11:
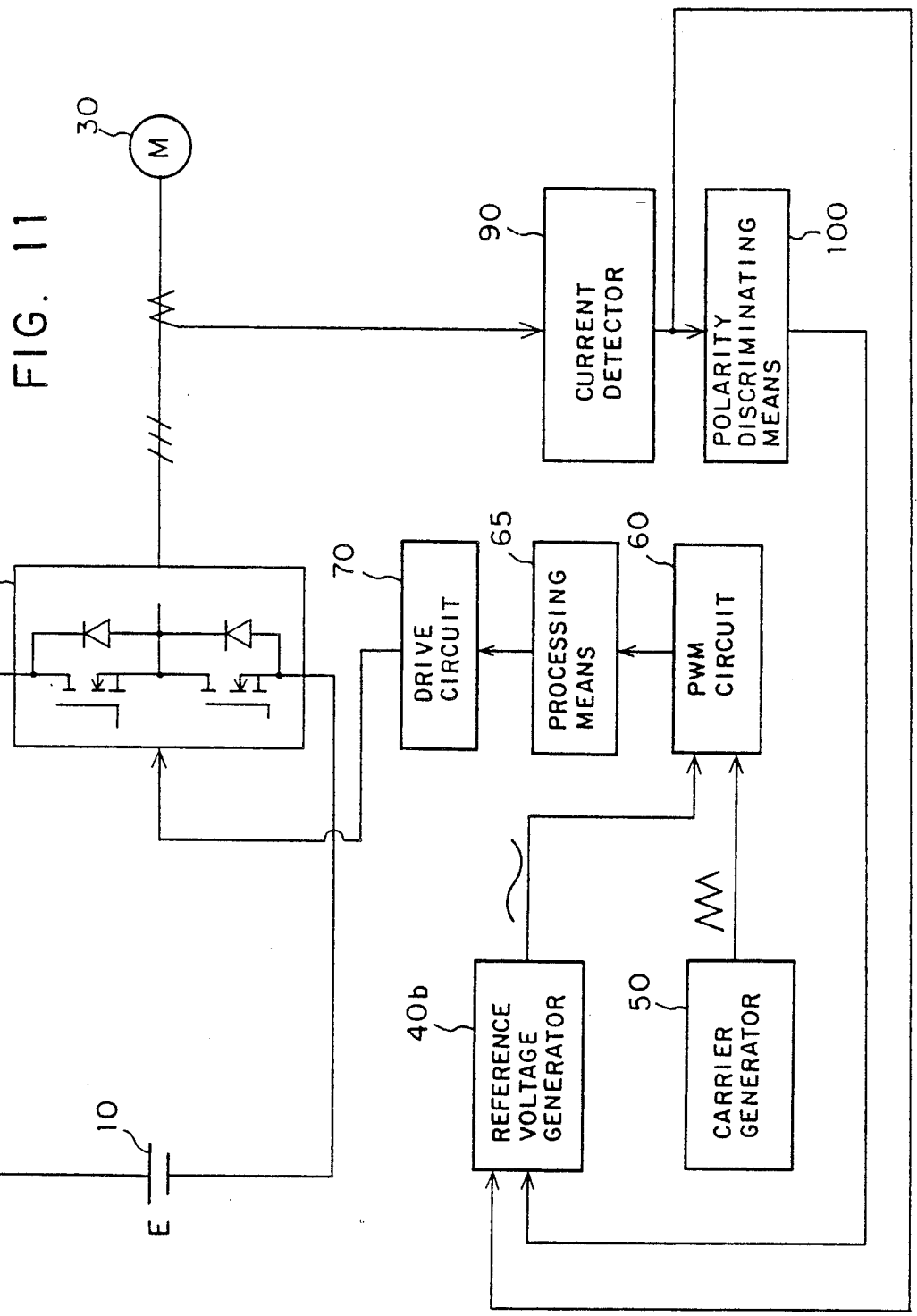
FIG. 11 is a block diagram showing the construction of a pulse-width modulation inverter apparatus according to a modification of the second embodiment of this invention.

A description will next be made on a modification of the second embodiment according to this invention with reference to the drawing. Referring to FIG. 11, numeral 40b indicates a reference voltage generator, as a reference signal generating means, for outputting a waveform that indicates a reference voltage as a reference of an output frequency or output voltage. This waveform is one for making maximum each period corresponding to $\pi/3$(rad) during a half cycle so as to saturate the same to be positive or negative, thereby controlling the remaining two phases (so called two-arm modulation control). Thus, this reference voltage generator serves to control such that each region within the saturated period during the half cycle corresponds substantially to the period indicative of zero level of the output current in response to each output from the current detector 90, and to correct the waveform representative of the reference voltage so as to counteract the influence of the short-prevention period $T_d$ on the output voltage.

Incidentally, in the same drawing, the same elements of structure as those in a conventional example shown in FIG. 24 are identified by like reference numerals and their description will therefore be omitted herein.

A description will next be made of the operation of the modification of the second embodiment. Incidentally, the method of generating a reference voltage waveform in the two-arm modulation mode has already been described by the above-described embodiment and its description will therefore be omitted herein. The elements of structure dissimilar to those in the above-described embodiments will be described with reference to FIGS. 11 and 6.

Let's now assume that a PWM signal is generated under the condition of a certain frequency or voltage so as to drive the electric motor 30. At this time, let's further assume that the load is relatively small and the U-phase output current flows as shown in FIG. 6(g). Then, the current detector 90 detects this state. Thereafter, the reference voltage generator 40b serves to receive the signal from the current detector 90 for generating the waveform indicative of the reference voltage illustrated in FIG. 6(d) in such a way that the reference voltage is saturated within the region of substantially zero level of the output current. Then, the reference voltage generator 40b serves to receive an output from a polarity discriminating means 100 for correcting the waveform representative of the reference voltage so as to counteract the influence of the short-prevention period $T_d$ on the output voltage (the correction method is the same as the conventional example and its description will therefore be omitted), thereby to supply the result to a PWM circuit 60. The U phase is hereinafter PWM-controlled based on the inputted signal. Incidentally, the V and W phases are also PWM-controlled in the same manner.

Figure 6:
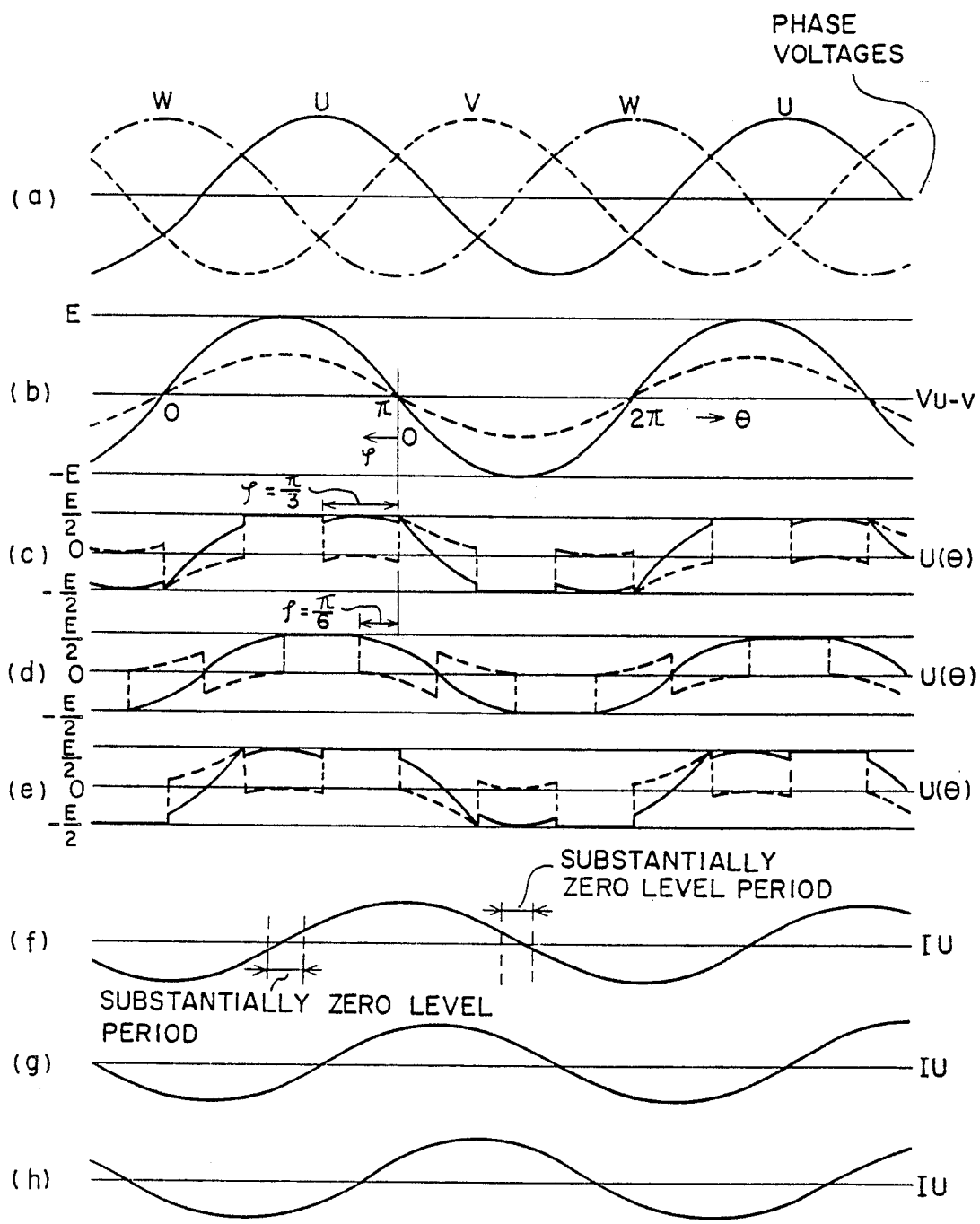

Assuming next that the load is rendered high thereby to make the power factor greater and the output current corresponding to the U phase flows as shown in FIG. 6 (f). In this case, the reference voltage generator 40b generates a waveform representative of a reference voltage, which is shown in FIG. 6(c), in response to the output from the current detector 90. Let's also assume that the load is in a regenerative mode and an output current corresponding to the U phase flows as shown in FIG. 6(h). At this time, the reference voltage generator 40b is responsive to the output from the current detector 90 for generating the waveform indicative of the reference voltage illustrated in FIG. 6(e). The subsequent operation is executed in the same manner as described above. The PWM circuit 60 serves to generate a PWM signal based on the waveform indicative of the reference voltage and the waveform indicative of the carrier frequency, which have been generated in the above-described manner. Thus, the waveform indicative of the reference voltage is formed such that the time interval during which the output current falls within the substantially zero level as described above, so that the saturated region is brought into a switching stop mode, thereby causing no influence of the short-prevention period $T_d$ on the output voltage. It is thus unnecessary to correct the influence of the short-prevention period $T_d$ on the output voltage within the period during which the output current falls within the substantially zero level even in the case where the accuracy of the polarity discriminating means 100 is insufficient, thereby causing no problems.

The region other than the above saturated region is also brought into a switching mode. It is thus necessary to correct the influence of the short-prevention period $T_d$ on the output voltage because the switching operation is performed. However, the output current is sufficiently large in this region and the polarity discriminating means 100 can function with high accuracy. It is thus possible to correct the influence of the short-prevention period $T_d$ in response to the output from the current detector 90. Accordingly, it is possible to always correct the influence of the short-prevention period $T_d$ even at any state of applied loads or any state of the power factor. Therefore, an ideal operation of the electric motor can be realized without any detectable formation of the reduction in voltage, the distortion in voltage, the torque ripples, the irregularity of rotation, etc.

Figure 12:
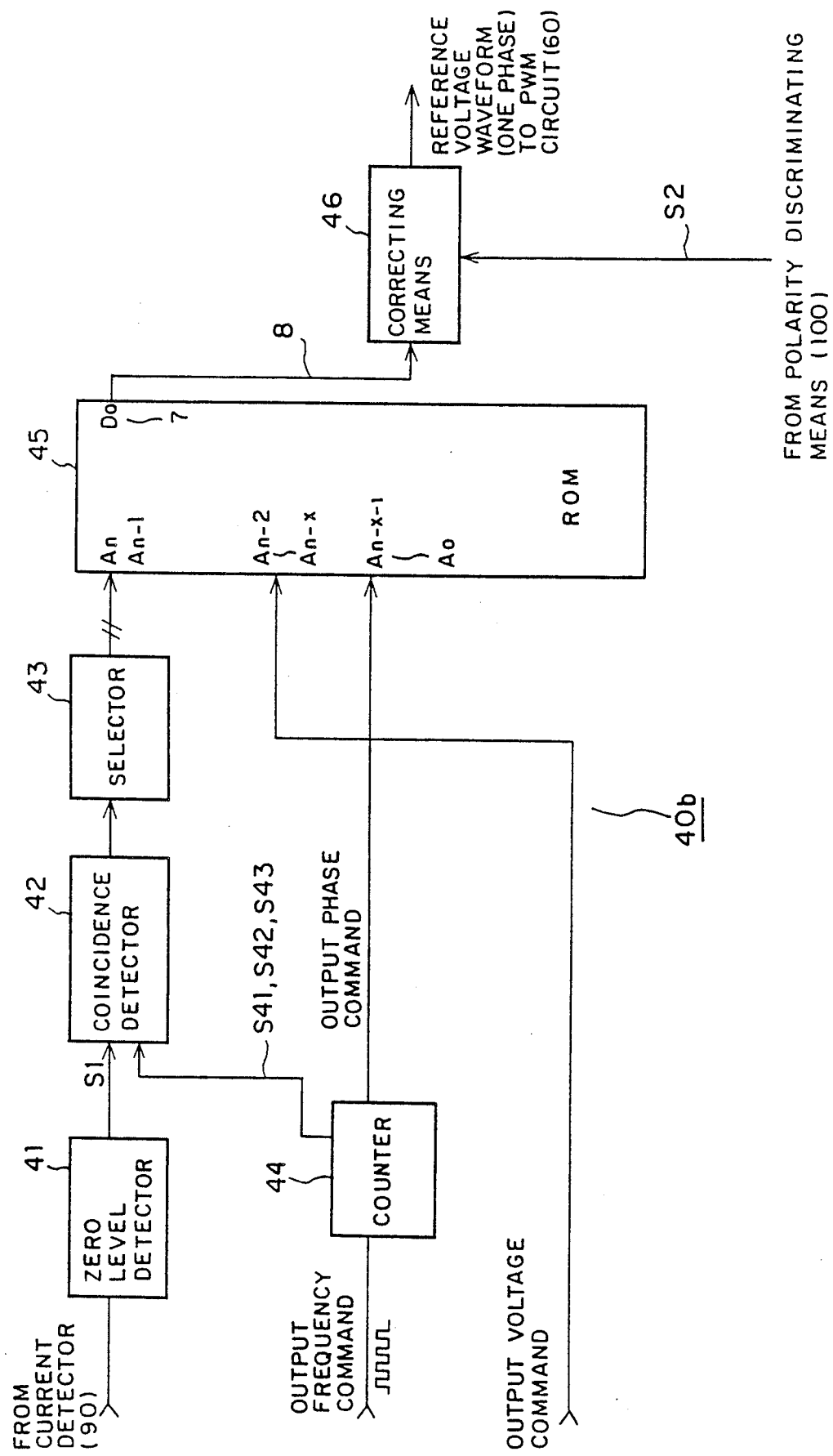
FIG. 12 is a circuit diagram depicting a reference-voltage generator according to a modification of the second embodiment of this invention.

FIG. 12 shows one example in which the reference voltage generator 40b having the above-described functions is constructed by a digital circuit. For the brevity of description, FIG. 12 depicts one example of the reference voltage generator 40b in the case where only a single phase is used. Incidentally, in the same drawing, the same elements of structure as those shown in FIG. 7 are identified by like reference numerals and their description will therefore be omitted herein. In FIG. 12, designated at numeral 46 is a means for correcting, in response to an output signal S2 from the polarity discriminating means 100, a distortion component $\Delta V$ in a direction in which the influence of the short-prevention period $T_d$ on the output voltage is counteracted, with respect to the non-saturated region of the waveform indicative of the reference voltage, thereby to supply the corrected signal to the PWM circuit 60.

Figure 13:
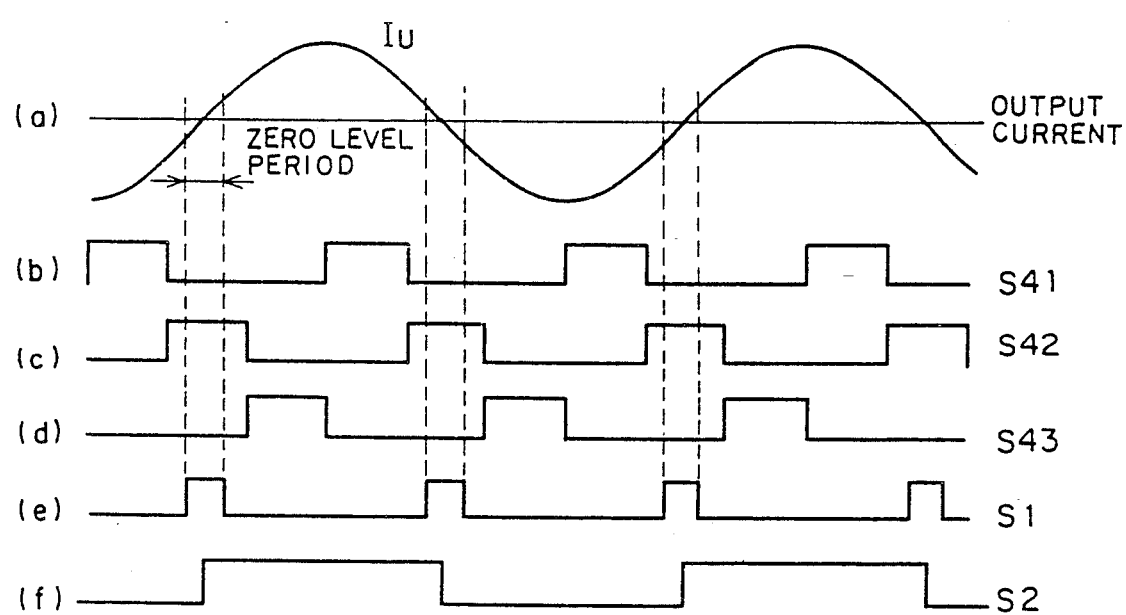
FIG. 13 is a graphic representation of the waveform shapes that indicate the operation of the reference-voltage generator according to the modification of the second embodiment of this invention.

FIG. 13 is a graphic representation of the shapes of waves that indicate the operation of the circuit shown in FIG. 12. At this time, the signal S1 detected within the period during which the output current falls within the substantially zero level coincides with the signal S42 out of the signals S41, S42 and S43, and at the same time, the selector 43 outputs data $(An, An-1) = (0,1)$ and the ROM 45 selects a waveform indicative of the reference voltage to supply the same to the correcting means 46. The correcting means 46 is responsive to this signal representing the reference voltage waveform for correcting the distortion component $\Delta V$ in the direction in which the influence of the short-prevention period $T_d$ on the output voltage is counteracted or cancelled, with respect to the non-saturated region of the selected reference voltage waveform, thereby to supply the result of correction to the PWM circuit 60. The same operation as described above is also performed with respect to other phases by the circuit similar to that employed in the above embodiment. The flow chart of operation of the present embodiment with respect to the other phases is similar to that in FIG. 10.

Figure 14:
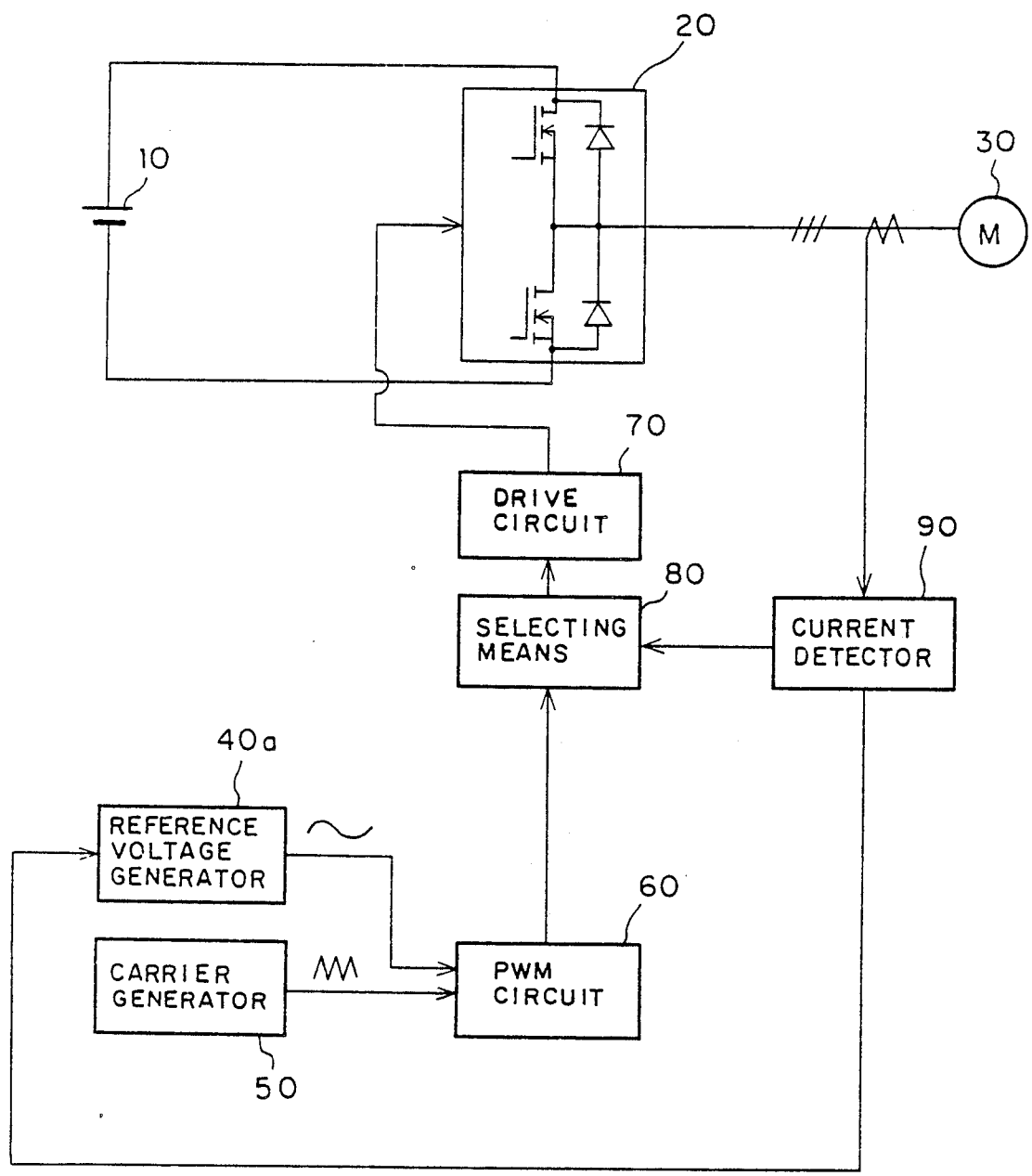
FIG. 14 is a block diagram illustrating the construction of a pulse-width modulation type inverter apparatus according to a third embodiment of this invention.

A description will next be made of a third embodiment of this invention with reference to FIG. 14. In FIG. 14, the same elements of structure as those shown in FIG. 1 or 3 are identified by like reference numerals and their description will therefore be omitted herein.

A description will next be made on the operation of the third embodiment. When a signal having such a reference voltage waveform as shown in FIG. 18(a) is supplied from a reference voltage generator 40a to a PWM circuit and a signal having a waveform indicative of a carrier frequency is fed from a carrier generator 50 to the PWM circuit, the PWM circuit 60 generates PWM signals $U_{PO}, U_{NO}$ shown in FIG. 18(b) based on both signals therefrom.

Let's now assume that output current $I_U$ flows in the form of a waveform shown in FIG. 18(a). At this time, the current detector 90 serves to detect this current for supplying the result to a selecting means 80, which is in turn responsive to the output signal from the current detector 90 so as to perform such an operation as described below.

In other words, let's now assume that the output $I_U$ is sufficiently large and assumes negative polarity In such a region, the output current $I_U$ falls under the control of switching operation of the lower-side controllable element as expressed in the above-described embodiment. Thus, the PWM signal $U_{UN}$ is selected but the PWM signal $U_{PO}$ is not chosen, so that this signal is brought into an off state.

Then, when the output current $I_U$ approaches a value in the vicinity of the zero level to be intersected therewith and then becomes substantially zero level, each period corresponding to $\pi/3(rad)$ during the half cycle in the reference voltage waveform corresponding to the U phase is rendered maximum, thereby to saturate the same so as to be positive or negative, and the remaining phases are then subjected to the two-arm modulation control at the reference voltage generator 40a, as in the above-described embodiment.

When the output current $I_U$ is next increased and changed from the negative polarity to the positive polarity so as to be free of the region of the substantially zero level for assuredly establishing the polarity of the output current, the output current $I_U$ falls under the control of switching operation of the 5 upper-side controllable element in such a region as in the above-described embodiment. Thus, the selecting means 80 selects the PWM signal $U_{PO}$ but does not select the PWM signal $U_{NO}$ at the lower-side controllable element, thereby rendering this signal off. Even when the conditions of a load or the like changes and the output current $I_U$ varies correspondingly, the same selection operation is made. Incidentally, the operation similar to that described above is also executed with respect to V and W phases.

Then, the drive circuit 70 performs a switching control operation of the upper and lower controllable elements in response to the signal from the selecting means 80, thereby to drive an electric motor 30 at the variable speed. Thus, an output voltage corresponding to the reference voltage waveform can be obtained even within a period during which the polarity of output current has been established and even in the region of the substantially zero level within which its polarity is not determined. It is thus unnecessary to establish the short-prevention period $T_d$. In addition, the distortion of the output voltage, reduction in the output voltage, torque ripple, irregularity in rotation, etc. does not appear and the high stability can be achieved.

Figure 15:
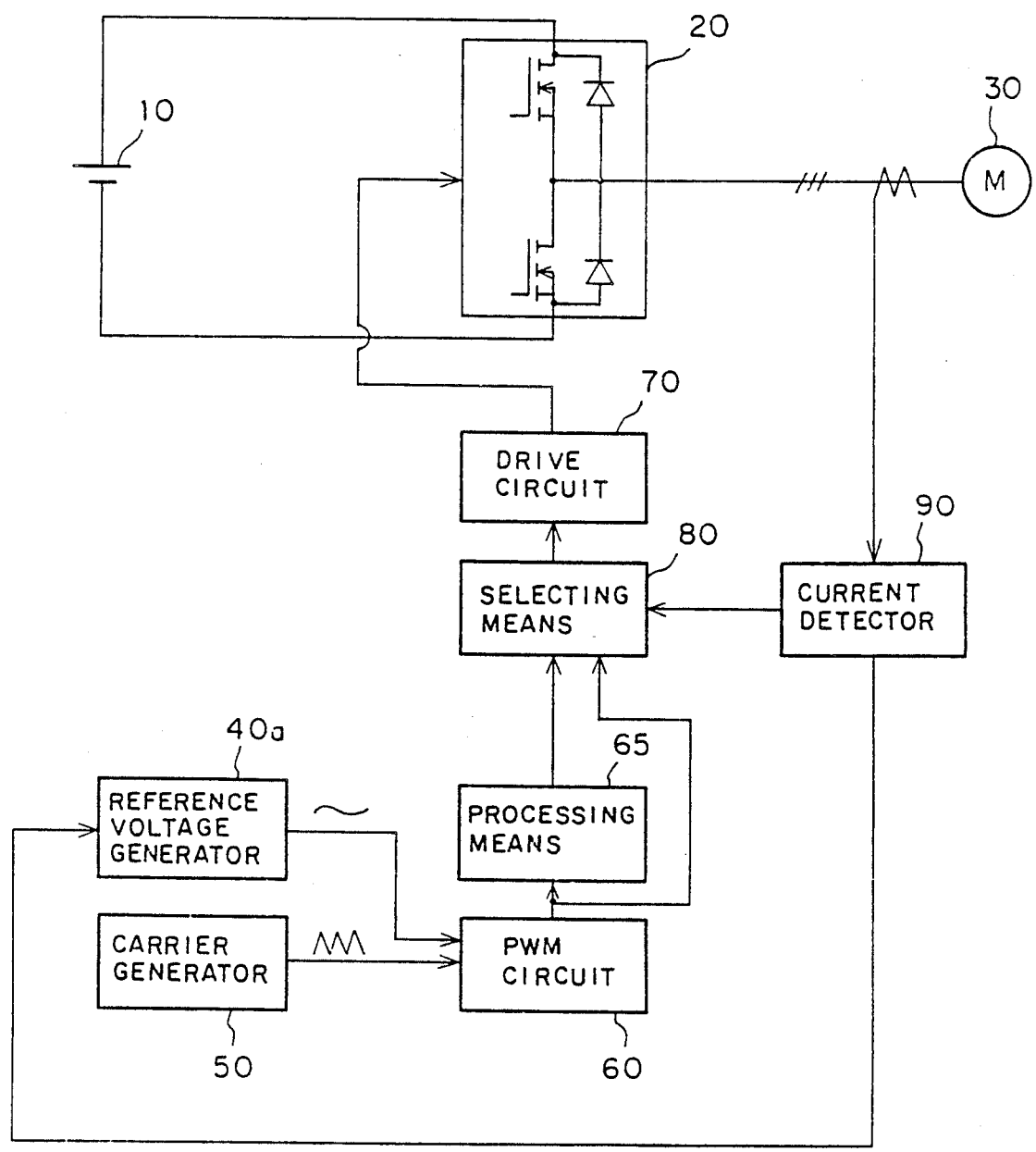
FIG. 15 is a block diagram depicting the construction of a pulse-width modulation type inverter apparatus according to a fourth embodiment of this invention.

The fourth embodiment of this invention will next be described with reference to FIG. 15. In FIG. 15, the same elements of structure as those shown in FIG. 1 or FIG. 14 are identified by like reference numerals and their description will therefore be omitted.

A description will next be made of the operation of the fourth embodiment. When a reference voltage having such a waveform as shown in FIG. 18(a) is now outputted from a reference voltage generator 40a and a carrier having such a waveform as depicted in FIG. 18(a) is generated by a carrier generator 50, PWM signals $U_{PO}, U_{NO}$ depicted in FIG. 18(b) are generated based on the reference voltage and the carrier by the PWM circuit 60. In addition, the short-prevention processed PWM signals $U_P, U_N$ shown in FIG. 18(c) are produced by the processing means 65 based on the PWM signal $U_{PO}, U_{NO}$.

Assuming now that the output current $I_U$ flows in such a state as illustrated in FIG. 18(a), the current detector 90 serves to detect this current for supplying the result of detection to the selecting means 80. Then, the selecting means 80 executes the following operations in response to the signal from the current detector 90.

In other words, let's now assume that the output current $I_U$ is sufficiently large and assumes negative polarity In such a region, the output current $I_U$ falls under the control of switching operation of the lower-side controllable element as stated in the above-described embodiment. Thus, the selecting means 80 selects the PWM signal $U_{NO}$ prior to the short-prevention processing but does not select the PWM signal $U_{PO}$ at the upper-side controllable element, so that this signal is brought into an off state.

Then, when the output current $I_U$ approaches a value in the vicinity of the zero level to be intersected therewith and then becomes the substantially zero level, each period corresponding to $\pi/3$(rad) during the half cycle in the reference voltage waveform corresponding to the U phase is rendered maximum, thereby to saturate the same so as to be positive or negative, and the remaining phases are then subjected to the two-arm modulation control at the reference voltage generator 40a, as in the above-described embodiment. For example, when a change in load is extremely large and the correction of the output voltage waveform falls within a range out of coverage by the above saturation operation, the reference voltage generator 40a serves to output such a reference voltage as shown in FIG. 18(a) as usual.

When the output current $I_U$ is next increased and changed from the negative polarity to the positive polarity so as to be free of the region of the substantially zero level for assuredly establishing the polarity of the output current, the output current $I_U$ falls under the control of switching operation of the upper-side controllable element in such a region as in the above-described embodiment. Thus, the selecting means 80 selects the PWM signal $U_{PO}$ prior to the short-prevention processing but does not select the PWM signal $U_{NO}$ at the lower-side controllable element, thereby rendering this signal off. Even when the conditions of a load or the like changes and the output current $I_U$ varies correspondingly, the same selection operation is made. Incidentally, the operation similar to that described above is also executed with respect to V and W phases.

Then, the drive circuit 70 performs switching control of the upper and lower controllable elements in response to the signal from the selecting means 80, thereby to drive an electric motor 30 at the variable speed. Thus, an output voltage corresponding to the reference voltage waveform can be obtained without being affected by the short-prevention period $T_d$ even within a period during which the polarity of output current has been established and even in the region of the substantially zero level within which its polarity is not fixed. Even when the change in load is extremely large and the correction of the output voltage waveform at the region of the substantially zero level of the output current becomes incomplete by the saturation operation of each phase, the output voltage waveform is little affected by the short-prevention period $T_d$, considering it as a whole because the short-prevention processing operation is executed by the processing means 65. Accordingly, the distortion of the output voltage, reduction in the output voltage, torque ripples, irregularity in rotation, etc. do not appear and high stability can be achieved.

In each of the above-described embodiments, an illustrative example of the ROM in which data corresponding to each of $\phi=\pi/3$(rad), $\phi=\pi/6$(rad) and $\phi=0$(rad) have been stored in advance, has been shown in FIG. 7 or FIG. 12. As an alternative, the logic processing of the data referred to above may be executed using a microcomputer, or the data may be arithmetically operated on for calculation instead storage of the data into the ROM 45.

The saturation period of the reference voltage waveform is represented by $\pi/3$(rad) for each half cycle by way of example in each of the above-described embodiment. It may be less than $\pi/3$(rad) in principle. Even in the case where at least output current which falls within the substantially zero level is saturated only during a period to make the logic level of an output voltage uncertain or during a period to change the, output current from the positive to negative polarity or vice versa, the same advantageous effects as those in the above-described embodiments can be effected.

In the above-described embodiment, after the level of the output current has been detected by the current detector 90, each of the reference voltage generators 40a, 40b have controlled such that the period during which this output current falls within the substantially zero level coincides substantially with the saturation period of the reference voltage waveform. However, if the characteristic of a load is distinct in advance and the relationship between information about the current level (for example, peakvalue information or information about the effective value) and information about the period of the substantially zero level can be determined by, the reference voltage waveform which has been determined in advance (or has been stored in advance) may be selected depending upon the information about the current level.

For example, in the case where the change in load is small or where it is clear in advance that a region within which deterioration in the drive characteristic of the electric motor gives rise to trouble can be covered by the saturation period $\pi/3$(rad) of the PWM signal, the same advantageous effects as those in each of the above-described embodiments can be effected even when $\phi$ is fixed and set to a desired value.

It has also been explained for the brevity of description that the cause of the voltage distortion is developed by the influence of the short-prevention period $T_d$ on the output voltage. However, the needless to say, a time delay or the like at each unit is also included in practice because it has influence on the output voltage.

According to the present invention, as has been described above, the output from the processing means is selected by the selecting means within the period during which the result of detection by the current detector falls within the substantially zero level. In addition, the selecting means serves to select only the signal corresponding to each switching element which effectively acts on the generation of the output current, out of the signals generated by the PWM signal generating means, during the period other than that referred to above, for outputting the selected signal as the drive signal of the switching element. Thus, the present invention can bring about an advantageous effect that the output voltage waveform can be corrected while controlling the influence of the short-prevention processing so as to be minimal, thereby making it possible to obtain output current with high stability.

Further, according to the present invention, the reference voltage generating means serves to make maximum the region corresponding to $\pi/3$(rad) during the half cycle of the output voltage waveform corresponding to the phase under which the output current is detected, for saturating the region, in association with the region of the substantially zero level of the output current from the inverter unit, which is detected by the current detector, and to generate the reference signal for performing the two-arm modulation control of the remaining phases so as to supply the generated signal to the PWM signal generating means. Thus, the present invention can bring about an advantageous effect that the correction of the output voltage waveform is assuredly performed even in the region where the output current is rendered minimum, thereby making it possible to obtain the output current with high stability.

Furthermore, according to the present invention, the reference signal generating means serves to make maximum the region corresponding to $\pi/3$(rad) during the half cycle of the output voltage waveform corresponding to the phase under which the output current is detected, for saturating the region, in association with the region of the substantially zero level of the output current detected by the current detector, and to generate the reference signal for performing the two-arm modulation control of the remaining phases so as to supply the same to the PWM signal generating means. In addition, when the result of detection by the current detector falls within the period other than that corresponding to the region of the substantially zero level, the selecting means serves to select only the signal corresponding to each switching element which effectively acts on the generation of the above output current, out of the signals generated by the PWM signal generating means, for outputting the selected signal as the drive signal of the switching element. Thus, the present invention can bring about an advantageous effect that the output voltage waveform can assuredly be corrected even in the minimal region of the output current and in the region other than the minimal region, thereby making it possible to obtain the output current with high stability.

Still further, according to the present invention, the reference signal generating means serves to make maximum the region corresponding to $\pi/3$(rad) during the half cycle of the output voltage waveform corresponding to the phase under which the output current is detected, for saturating the region, in association with the region of the substantially zero level of the output current detected by the current detector, and to generate the reference signal for performing the two-arm modulation control of the remaining phases so as to supply the same to the PWM signal generating means. In addition, the selecting means serves to select the signal generated by the processing means during the period of the substantially zero level of the current detected by the current detector, and to select only the signal corresponding to each switching element which effectively acts on the generation of the output current, out of the signals generated by the PWM signal generating means, for outputting the selected signal as the drive signal of each switching element. Thus, the present invention can bring about an advantageous effect that the correct[on of the output voltage waveform can assuredly be performed even in the region at which the output current is rendered minimum and in the region other than the minimal region and the output current with high stability, which can meet any state of the load.

Having now fully described the invention, it will be apparent to those skilled in the art that many changes and modifications can be made without departing from the spirit or scope of the invention as set forth herein.

What is claimed is:

1. A pulse-width modulation type inverter apparatus, comprising:
    an inverter unit composed of arms connected in the form of a three-phase bridge, said arms each including a pair of switching elements which are connected in series and on/off controlled in a complementary form;
    a current detector for detecting output current from said inverter unit:
    PWM signal generating means for generating pulse-width modulation signals for controlling each of said switching elements;
    processing means for subjecting each signal generated by said PWM signal generating means to processing for preventing a short circuit between said paired switching elements: and
    means for selecting each signal generated by said processing means within a period during which the current detected by said current detector falls within a region of substantially zero level and for selecting only a signal corresponding to each switching element which effectively acts on the generation of said output current during a period other than said zero level period, out of all signals generated by said PWM signal generating means, thereby to output the same as a drive signal for said each switching element.

2. A pulse-width modulation type inverter apparatus according to claim 1, wherein said processing means serves to delay on-timing of each PWM signal as an output generated by said PWM signal generating means by a time interval corresponding to a short-prevention period.

3. A pulse-width modulation type inverter apparatus according to claim 2, wherein each of said pair of switching elements includes an upper-side controllable switching element connected to the positive terminal of a d.c. power supply and a lower-side controllable switching element connected to the negative terminal of said d.c. power supply, said selecting means selecting each signal generated by said PWM signal generating means, which corresponds to said upper-side controllable switching element in order to control said upper-side controllable switching element when said current detector detects that the output current from said inverter unit is of positive polarity, and which corresponds to said lower-side controllable switching element in order to control said lower-side controllable switching element when said current detector detects that the output current from said inverter unit is of negative polarity, and further to select each one of output signals from said processing means in order to control said both controllable switching elements when said current detector detects that the output current is of such a level that the polarity of the output current is incapable of being specified.

4. A pulse-width modulation type inverter apparatus, comprising:
    an inverter unit composed of arms connected in the form of a three-phase bridge, said arms each including a pair of switching elements which are connected in series and on/off controlled in a complementary form;
    a current detector for detecting output current from said inverter unit:
    PWM signal generating means for generating pulse-width modulation signals for controlling each of said switching elements;

processing means for subjecting each signal generated by said PWM signal generating means to processing for preventing a short circuit between said pair of switching elements; and reference signal generating means for generating a reference voltage signal in the form of a sine wave for each phase to said PWM signal generating means, and for saturating a region up to $\pi/3$ rad at the maximum during a half cycle of each output voltage waveform corresponding to a certain phase, in association with a region of substantially zero level of the output current of said phase detected by said current detector, thereby to perform two-arm modulation of the remaining phases.

5. A pulse-width modulation type inverter apparatus according to claim 4, wherein said processing means serves to delay on-timing of each output signal generated by said PWM signal generating means by a time interval corresponding to a short-prevention period.

6. A pulse-width modulation type inverter apparatus according to claim 5, wherein said reference signal generating means outputs each said reference voltage signal which corresponds to a certain phase and is set to be a saturated voltage when said current detector detects that the output current corresponding to the certain phase and outputted from said inverter unit falls within a time interval of the zero level.

7. A pulse-width modulation type inverter apparatus according to claim 6, wherein said pulse-width modulation signals of said certain phase are each prevented from being changed to another state upon saturation of the reference voltage.

8. A pulse-width modulation type inverter apparatus according to claim 6, wherein said reference voltage generating means includes a zero level detector for detecting a time interval corresponding to zero level, a counter for counting each of a plurality of clock signals for specifying output frequencies at said inverter unit so as to output three kinds of phase discriminating signals, a ROM adapted to store a plurality of reference voltage waveforms therein, a coincidence detector for judging to which phase discriminating signal the time interval of the zero level detected by said zero level detector corresponds, so as to output each one of said phase discriminating signals, which corresponds to the time interval of the zero level, and a selector for outputting each of addresses which designate an area in said ROM, in which data about said each reference voltage waveform associated with each phase discriminating signal outputted by said coincidence detector has been stored.

9. A pulse-width modulation type inverter apparatus according to claim 8, wherein said ROM includes data about each reference voltage waveform phase interval corresponding to each of $\pi/3$(rad), $\pi/6$(rad) and 0(rad).

10. A pulse-width modulation type inverter apparatus according to claim 6, further comprising means for discriminating the polarity of output current from said inverter unit and wherein said reference signal generating means further serves to correct each reference voltage signal in accordance with the polarity designated by each one of polarity discriminating signals which are outputted by said polarity discriminating means in order to reduce distortion components which appear at each output voltage from said inverter unit during said short-prevention period.

11. A pulse-width modulation type inverter apparatus according to claim 10, wherein said reference voltage generating means includes a zero level detector for detecting a time interval corresponding to zero level, a counter for counting each of a plurality of clock signals for specifying output frequencies et said inverter unit so as to output three kinds of phase discriminating signals, a ROM adapted to store a plurality reference voltage waveforms therein, a coincidence detector for judging to which phase discriminating signal the time interval of the zero level detected by said zero level detector corresponds, so as to output one of said phase discriminating signals, which corresponds to the time interval of the zero level, a selector for outputting each of addresses which designate an area in said ROM, in which data about said reference voltage waveform associated with each phase discriminating signal outputted by said coincidence detector has been stored, and means for correcting each output data from said ROM in accordance with the polarity designated by each one of polarity discriminating signals which are to be outputted by said polarity discriminating means.

12. A pulse-width modulation type inverter apparatus according to Claim 11, wherein said ROM includes, data about each reference voltage waveform phase interval corresponding to each of $\pi/3$(rad), $\pi/6$(rad) and 0(rad).

13. A pulse-width modulation type inverter apparatus, comprising:
an inverter unit composed of arms connected in the form of a three-phase bridge, said arms including a pair of switching elements which are connected in series and on/off controlled in a complementary form;
a current detector for detecting output current of each phase from said inverter unit;
PWM signal generating means for generating pulse-width modulation signals for controlling each of said switching elements;
reference signal generating means for generating a reference voltage signal in the form of a sine wave for each phase to said PWM signal generating means, and for saturating a region up to $\pi/3$ rad at the maximum during a half cycle of each output voltage waveform corresponding to a certain phase, in association with a region of substantially zero level of current detected by current detectors thereby to perform two- arm modulation of the remaining phases; and
means for selecting, based upon each output signal from said current detector, only a signal corresponding to each switching element which effectively acts on the generation of said output current, from all signals generated by said PWM signal generating means, thereby to output the same as a drive signal for said each switching element.

14. A pulse-width modulation type inverter apparatus according to claim 13, wherein each of said pair of switching elements include an upper-side controllable switching element connected to the positive terminal of a d.c. power supply and a lower-side controllable switching element connected to the negative terminal of said d.c. power supply, said reference signal generating means outputs each said reference voltage signal which corresponds to a certain phase and is set to be a saturated voltage when said current detector detects that the output current corresponding to the certain phase and outputted from said inverter unit falls within a time interval of the zero level, and said selecting means selects only a signal generated by said PWM signal generating means which corresponds to said upper-side controllable switching element in order to control said upper-side controllable switching element when said current detector detects that the output current from said inverter unit is of positive polarity, and selects only a signal generated by said PWM signal generating means which corresponds to said lower-side controllable switching element in order to control said lower-side controllable switching element when said current detector detects that the output current from said inverter unit is of negative polarity.

15. A pulse-width modulation type inverter apparatus, comprising:

an inverter unit composed of arms connected in the form of a three-phase bridge, said arms including a pair of switching elements which are connected in series and on/off controlled in a complementary form;

a current detector for detecting output current from said inverter unit;

PWM signal generating means for generating pulse-width modulation signals for controlling each of said switching elements;

processing means for subjecting each signal generated by said PWM signal generating means to processing for preventing a short circuit between said pair of switching elements;

reference signal generating means for generating a reference voltage signal in the form of a sine wave for each phase to said PWM signal generating means, and for saturating a region up to $\pi/3$ rad at the maximum during a half cycle of each output voltage waveform corresponding to a certain phase, in association with a region of substantially zero level of output current detected by said current detector, thereby to perform two-arm modulation of the remaining phases; and means for selecting each signal generated by said processing means within a period during which current detected by said current detector falls within a region of substantially zero level and for selecting only a signal corresponding to each switching element which effectively acts on the generation of said output current during a period other than said zero level period, out of all signals generated by said PWM signal generating means, thereby to output the same as a drive signal for said each switching element.

16. A pulse-width modulation type inverter apparatus according to claim 15, wherein said processing means serves to delay on-timing of each output signal generated by said PWM signal generating means by a time interval corresponding to a short-prevention period.

17. A pulse-width modulation type inverter apparatus according to claim 16, wherein each of said pair of switching elements include an upper-side controllable switching element connected to the positive terminal of a d.c. power supply and a lower-side controllable switching element connected to the negative terminal of said d.c. power supply, said reference signal generating means outputs each said reference voltage signal which corresponds to a certain phase and is set to be a saturated voltage when said current detector detects that the output current corresponding to the certain phase and outputted from said inverter unit falls within a time interval of the zero level, and said selecting means selects each signal generated by said PWM signal generating means which corresponds to said upper-side controllable switching element in order to control said upper-side controllable switching element when said current detector detects that the output current from said inverter unit is of positive polarity, and selects each signal generated by said PWM signal generating means which corresponds to said lower-side controllable switching element in order to control said lower-side controllable switching element when said current detector detects that the output current from said inverter unit is of negative polarity, and further to select each one of output signals from said processing means in order to control said both controllable switching elements when said current detector detects that each output current from said inverter unit has exceeded a region for correcting each output voltage waveform based on the control of said reference voltage generating means.

* * * * *

UNITED STATES PATENT AND TRADEMARK OFFICE
CERTIFICATE OF CORRECTION

PATENT NO. : 5,072,354

DATED : December 10, 1991

INVENTOR(S) : Masayuki Katto et al.

It is certified that error appears in the above-identified patent and that said Letters Patent is hereby corrected as shown below:

On the cover page, in the Abstract, line 6, after "wherein" delete the comma ",".

Column 1, line 9, delete "voltage" (first occurrence);

lines 16 and 17, delete "In the same drawing, designated at numeral";
line 23, delete "the";
line 35, "waveforms" should be --waveform--.

Column 2, line 58, after "$T_d$" insert a period --.--

Column 3, line 34, "dele-" should be -- detec- --.
line 58, after "voltage" insert a period --.--.

Column 4, line 4, "This" should be --In this--.

Column 6, line 3, "judgement" should be --judgment--.

Column 8, line 27, after "2" insert --is--.

Column 9, line 20, "waveform" should be --waveforms--;
line 37, after "within" insert --a--;
line 42, "judgement" should be --judgment--.

UNITED STATES PATENT AND TRADEMARK OFFICE
CERTIFICATE OF CORRECTION

PATENT NO.   : 5,072,354
DATED        : December 10, 1991
INVENTOR(S)  : Masayuki Katto et al.

It is certified that error appears in the above-identified patent and that said Letters Patent is hereby corrected as shown below:

```
Column 10, line 30, after "bus" insert --P--.

Column 11, line 46, "TR_up" should be --TR_UN--;
           line 55, "the" should be --a--.

Column 12, line 48, "φ" should be --φ--;
           line 50, "φ" should be --φ--;
           line 55, "φ" should be --φ--;
           line 56, "φmay" should be --φ may--;
           line 59, "φ" should be --φ--;
           line 60, "φ + π" should be --θ + φ--.

Column 13, line 12, "π" (second occurrence) should
           be --φ--;
           line 28, "φ" should be --φ--;
           line 29, "φ" should be --φ--;
           line 31, after "where" insert --φ--;
           line 40, "φ" (both occurrences) should
           be --φ--;
           line 47, "φ" should be --φ--;
           line 49, "φ" should be --φ--;
           line 50, "φ" should be --φ--;
           line 53, after "of" insert --a--.
```

UNITED STATES PATENT AND TRADEMARK OFFICE
CERTIFICATE OF CORRECTION

PATENT NO. : 5,072,354

DATED : December 10, 1991

INVENTOR(S) : Masayuki Katto et al.

It is certified that error appears in the above-identified patent and that said Letters Patent is hereby corrected as shown below:

Column 14, line 37, delete "one example of";
line 48, after "periods" delete the comma ",";
line 53, "ϕ" should be --φ--;
line 56, "ϕ" should be --φ--;
line 58, "ϕ" should be --φ--;
line 68, "ϕ" (all occurrences) should be --φ--, and "33" should be --3--.

Column 15, line 30, "ϕ" should be --φ--.

Column 17, line 66, after "polarity" insert a period --.--.

Column 19, line 3, after "polarity" insert a period --.--;
line 34, should not be a new paragraph;
line 67, "ϕ" (all occurrences) should be --φ--.

Column 20, line 13, after "the" delete the comma ",";
line 29, after "by" insert --φ--;
line 39, "ϕ" should be --φ--;
line 44, delete "the" (second occurrence).

Column 21, line 58, "correct[on" should be --correction--.

Column 23, line 8, "rad" should be --(rad)--.

UNITED STATES PATENT AND TRADEMARK OFFICE
CERTIFICATE OF CORRECTION

PATENT NO. : 5,072,354

DATED : December 10, 1991

INVENTOR(S) : Masayuki Katto et al.

It is certified that error appears in the above-identified patent and that said Letters Patent is hereby corrected as shown below:

Column 24, line 3, "et" should be --at--;
           line 5, after "plurality" insert --of--;
           line 21, after "includes" delete the comma ",";
           line 40, "rad" should be --(rad)--;
           line 44, after "by" insert --said-- and "detectors" should be --detector--.

Column 25, line 30, "rad" should be --(rad)--.

Signed and Sealed this

Thirtieth Day of November, 1993

BRUCE LEHMAN

Attest:

Attesting Officer      Commissioner of Patents and Trademarks